United States Patent
Allan et al.

(10) Patent No.: US 7,278,640 B2
(45) Date of Patent: Oct. 9, 2007

(54) QUICK-CONNECT CHUCK MECHANISM

(75) Inventors: Scott W. Allan, Kitchener (CA); Maz A. Hasan, Kitchener (CA); Satnam Singh, Waterloo (CA); Kailash C. Vasudeva, Waterloo (CA)

(73) Assignee: Maxtech Manufacturing Inc., Waterloo, Ontario (CA)

( * ) Notice: Subject to any disclaimer, the term of this patent is extended or adjusted under 35 U.S.C. 154(b) by 512 days.

(21) Appl. No.: 10/632,977

(22) Filed: Aug. 4, 2003

(65) Prior Publication Data

US 2004/0021276 A1 Feb. 5, 2004

Related U.S. Application Data

(60) Provisional application No. 60/400,037, filed on Aug. 2, 2002.

(51) Int. Cl.
B23B 5/22 (2006.01)

(52) U.S. Cl. ............... 279/79; 279/9.1; 279/80; 279/96

(58) Field of Classification Search ......... 279/9.1, 279/79, 80, 96, 102, 103, 138, 43.7, 54, 46.7, 279/23.1, 46.1, 46.2, 140, 904; 403/229
See application file for complete search history.

(56) References Cited

U.S. PATENT DOCUMENTS

| | | | |
|---|---|---|---|
| 1,119,276 A | 12/1914 | Griffith et al. | |
| 1,516,257 A | 11/1924 | White | |
| 2,105,330 A * | 1/1938 | Pagenkopf | ............. 279/23.1 |
| 2,135,861 A | 11/1938 | Thompson | |
| 2,356,835 A | 8/1944 | Duckett | |
| 2,467,606 A * | 4/1949 | Young | ............. 279/23.1 |
| 2,539,610 A * | 1/1951 | Bunch | ............. 81/53.2 |
| 2,559,895 A * | 7/1951 | Norlander | ............. 279/23.1 |
| 2,564,893 A * | 8/1951 | Gibbons | ............. 279/23.1 |
| 2,570,570 A * | 10/1951 | Lee | ............. 279/23.1 |
| 2,610,065 A * | 9/1952 | Banker | ............. 279/23.1 |
| 2,818,264 A * | 12/1957 | Overstreet | ............. 279/2.17 |
| 3,091,473 A | 5/1963 | Bilz | |
| 3,788,658 A | 1/1974 | Benjamin et al. | |
| 3,967,831 A * | 7/1976 | Chang et al. | ............. 279/23.1 |
| 4,287,923 A | 9/1981 | Hornung | |
| 4,491,444 A | 1/1985 | Rumpp et al. | |
| 4,577,875 A | 3/1986 | Miyakawa | |
| 4,582,332 A * | 4/1986 | Sekino et al. | ............. 279/23.1 |
| 4,692,073 A | 9/1987 | Martindell | |

(Continued)

FOREIGN PATENT DOCUMENTS

CA 2373060 11/2000

(Continued)

*Primary Examiner*—Willmon Fridie, Jr.
(74) *Attorney, Agent, or Firm*—R. Craig Armstrong; Borden Ladner Gervais LLP

(57) ABSTRACT

A chuck is provided for retaining the shank of a tool bit or accessory, having a fixed diameter, inserted in a central channel at a distal end of the chuck. At least one torsion spring is mounted axially within a housing and has an inner dimension and shape comparable to the shank's outer dimension and shape. A mechanism winds and unwinds the torsion spring to respectively grip or release said shank, the winding being in a rotational direction consistent with a normal operating rotational direction of said chuck such that said shank tends to further wind the torsion spring for further self-tightening in normal operation.

19 Claims, 23 Drawing Sheets

U.S. PATENT DOCUMENTS

| | | |
|---|---|---|
| 4,736,658 A | 4/1988 | Jore |
| 4,850,758 A | 7/1989 | Morgan |
| 4,900,202 A | 2/1990 | Wienhold |
| 5,013,194 A | 5/1991 | Wienhold |
| 5,062,749 A | 11/1991 | Sheets |
| 5,447,397 A | 9/1995 | Asano |
| 5,452,906 A | 9/1995 | Huff et al. |
| 5,476,273 A | 12/1995 | Shadeck et al. |
| 5,765,449 A * | 6/1998 | LeMire ........................ 74/553 |
| 5,826,888 A * | 10/1998 | Weaver et al. ............. 279/23.1 |
| 5,996,452 A | 12/1999 | Chiang |
| 6,059,493 A * | 5/2000 | Kirn et al. ................... 408/226 |
| 6,199,872 B1 | 3/2001 | Hasan |
| 6,364,318 B1 | 4/2002 | Bedi et al. |

FOREIGN PATENT DOCUMENTS

| | | |
|---|---|---|
| CA | 2315923 | 2/2001 |
| CA | 2315992 | 2/2001 |
| DE | 3324756 | 1/1985 |
| DE | 4141045 | 6/1993 |
| TW | 526107 | 4/2003 |

* cited by examiner

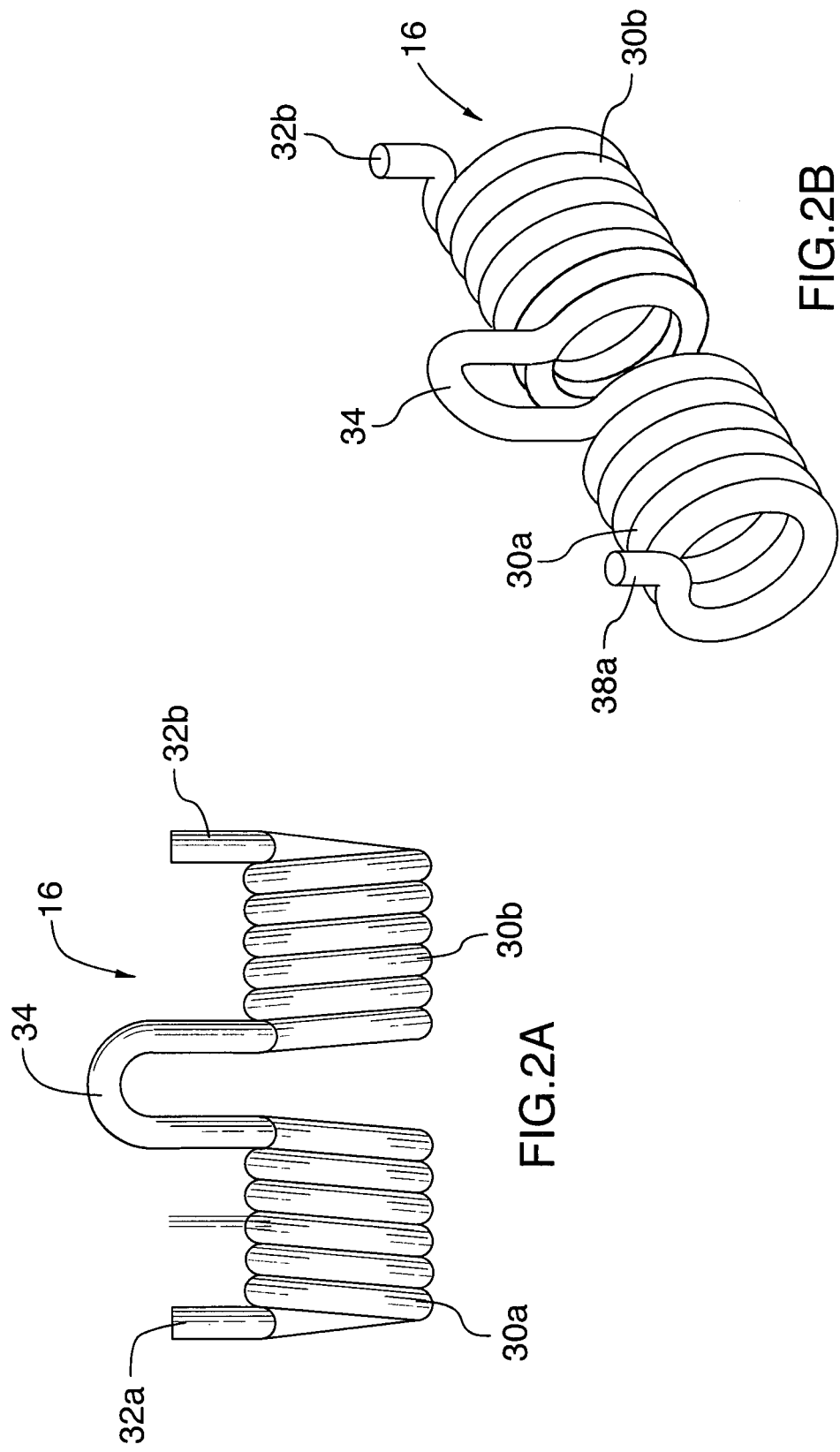

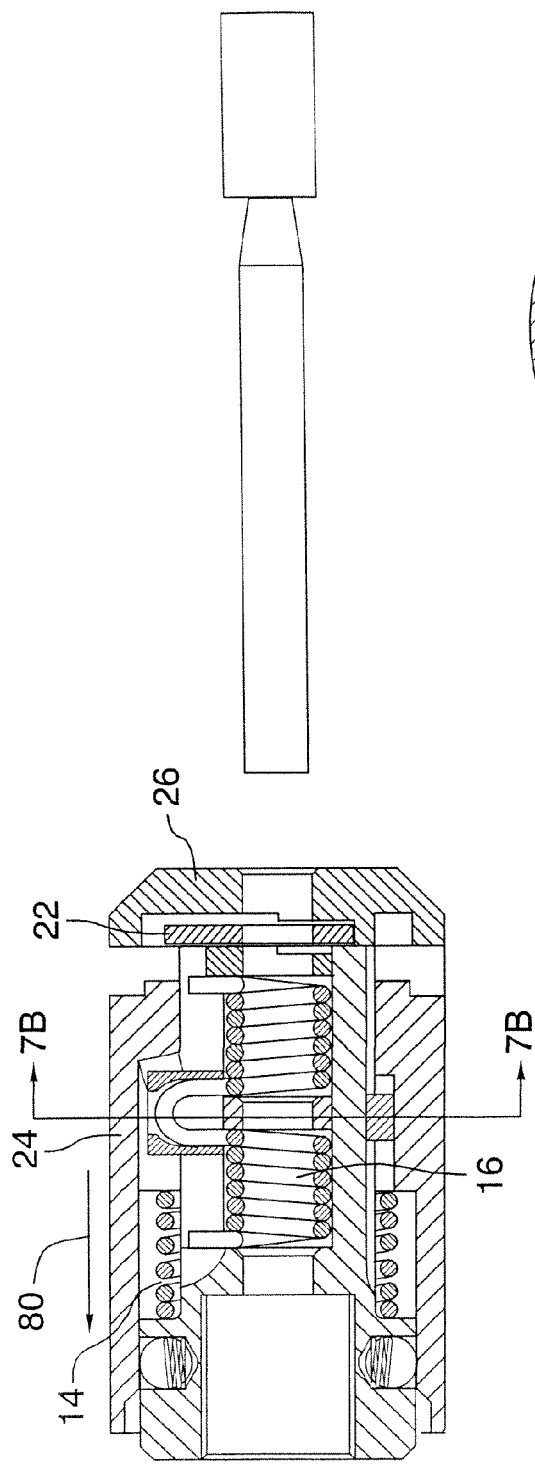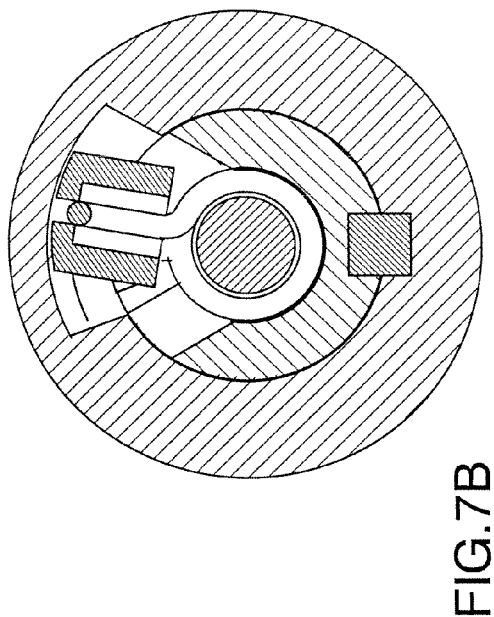
FIG.7A
FIG.7B

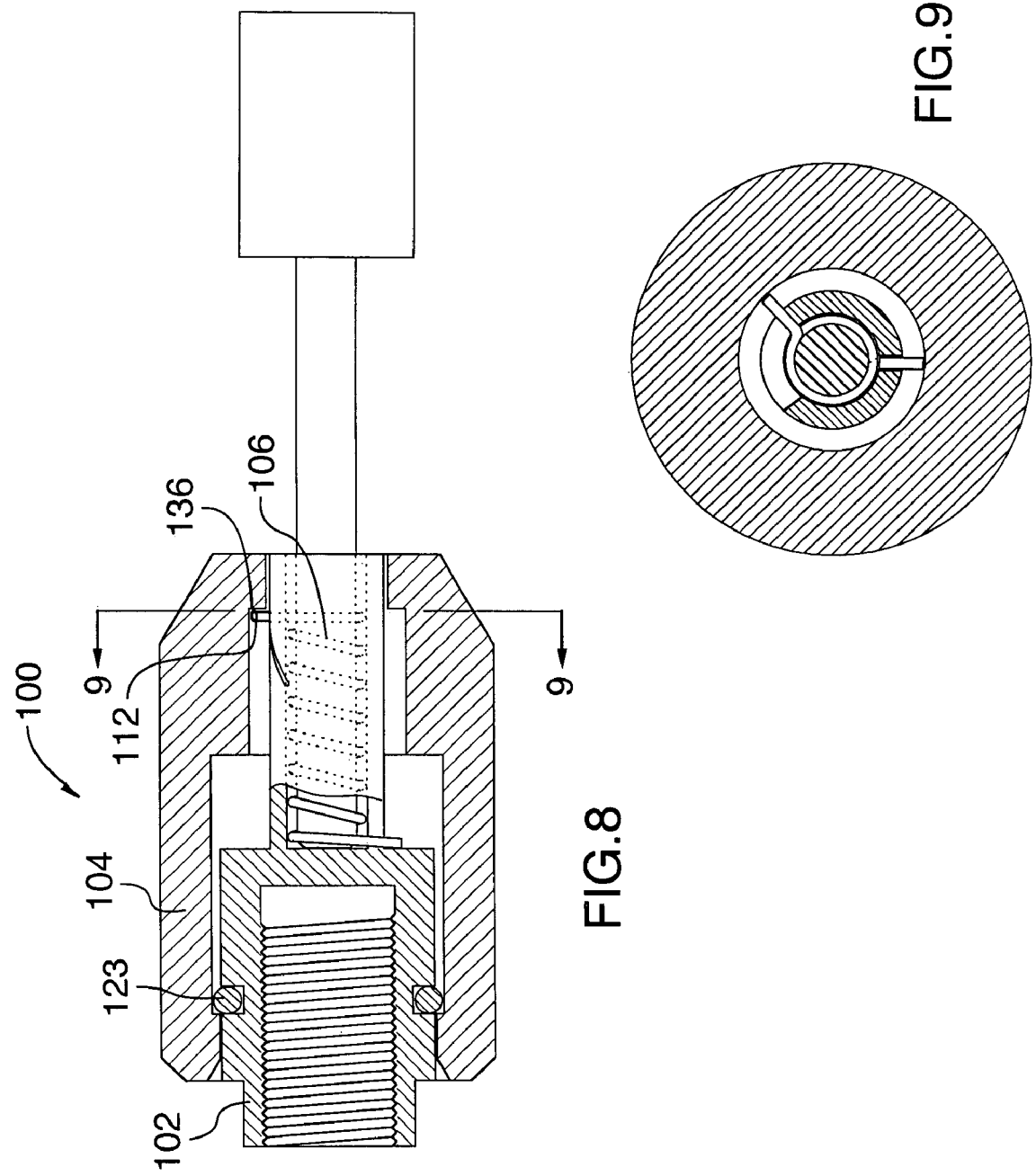

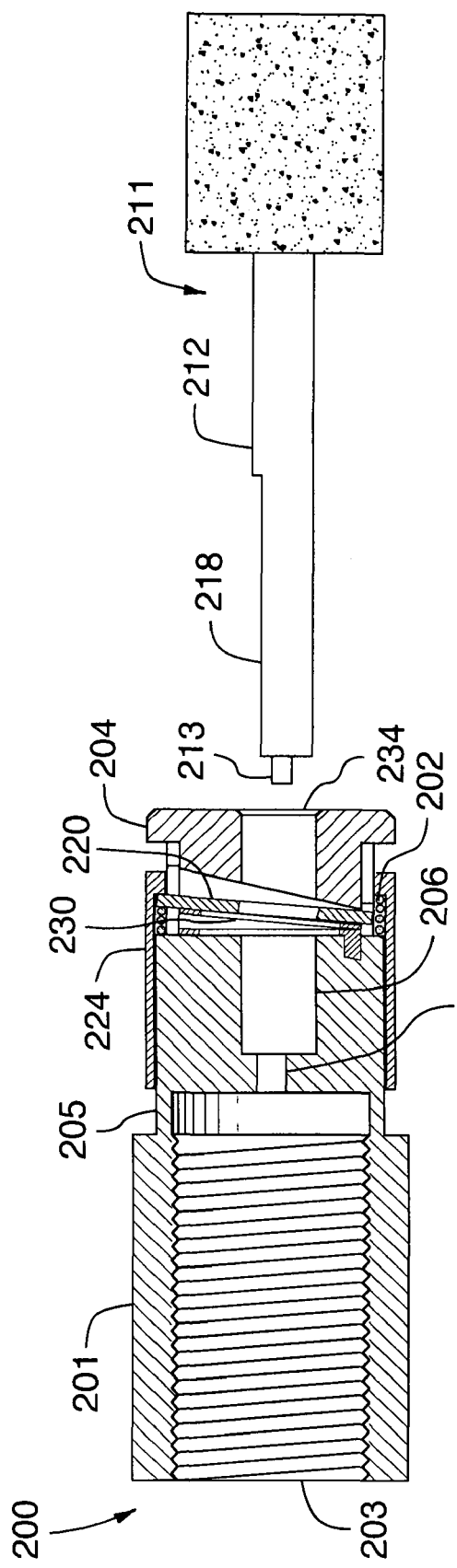
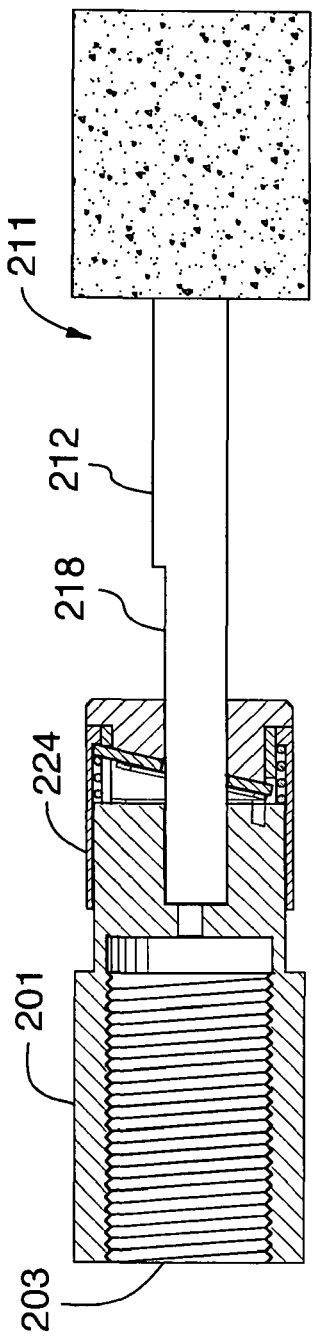
FIG.30
FIG.31

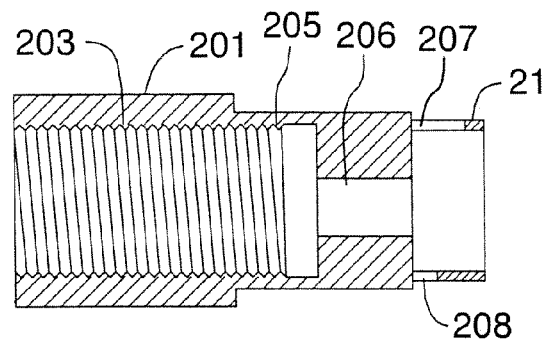 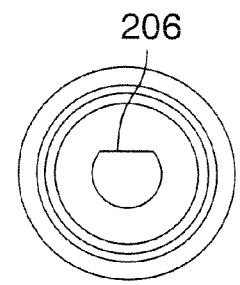
FIG.39  FIG.40
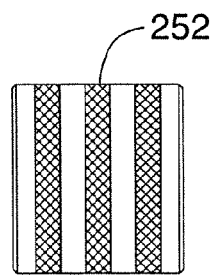 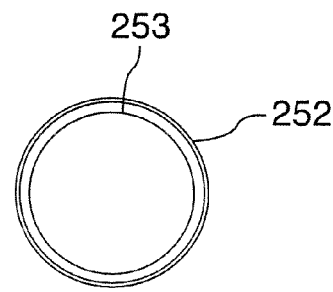
FIG.41  FIG.42
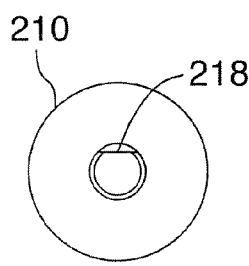 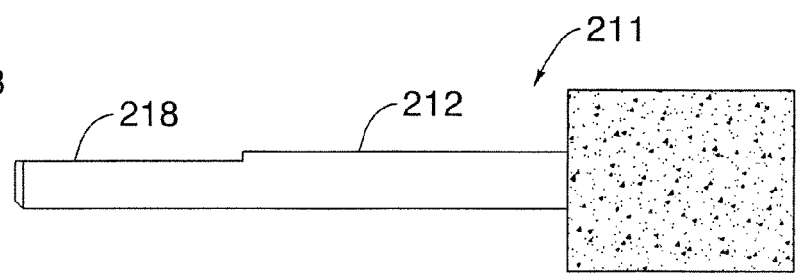
FIG.43  FIG.44

QUICK-CONNECT CHUCK MECHANISM

FIELD OF THE INVENTION

This is a formal application based on and claiming the benefit of provisional application No. 60/400,037, filed Aug. 2, 2002.

The present invention relates generally to power tools and accessories. More particularly, the present invention relates to an improved chuck for use with a rotary and/or hobby tool.

BACKGROUND OF THE INVENTION

This invention relates to accessories for rotary tools. More specifically, this invention relates to mechanisms or chucks for retaining, preferably round shanked tool bits or accessories for preferably unidirectional rotary tools such as those sold under the Dremel, Black & Decker or Craftsman trademarks that offer conventional methods to achieve tool change and holding capability.

Due to problems associated with gripping and driving tool bits with round shanks, one known solution is via a collet and a tightening nut, which is rotated to secure the shank of the tool bit. The shortcoming of this design is the cumbersome and time-consuming tool changes. Generally, a spindle of the rotary tool is locked in one position and held there. A separate tool; such as an open-ended wrench, is used to engage the nut to loosen it from the collet. The tool bit or accessory is then removed from the tool. To install another accessory, the reverse operation is performed. The spindle is locked into place again and held in that position. The shank of the tool bit or accessory is inserted into the collet and the nut is tightened. An open-ended wrench is used to securely tighten the shank in the collet. As well as being too time-consuming, this method is also inconvenient since a user grasps the tool and locks the spindle in place, while simultaneously inserting the accessory into the collet and tightening the nut around the shank of the accessory. This method also requires the use of a separate tool to tighten and loosen the shank of the accessory from the collet.

Another method of attaching accessories to rotary tools is by using a three-jaw chuck. In this method, again, the spindle of the tool is locked into position, while the chuck is tightened on the shank of the tool bit or accessory. In some cases, a separate tool, such as a wrench or Allen key, is used to tighten or loosen the chuck once it has been finger-tightened. This method again requires the user to change the tool bit or accessory using both hands when there are three areas the user must contact: the spindle, the shank, and the chuck.

There is a need for a mechanism that provides quicker tool changing yet equals or betters the mechanism's capability to hold the tool in its operation. There is also a need for a mechanism that does not require any extra tools for operation.

It is, therefore, desirable to provide an improved chuck for a use with a rotary tool.

SUMMARY OF THE INVENTION

It is an object of the present invention to obviate or mitigate at least one disadvantage of previous chucks for rotary tools by providing a chuck that accommodates and provide torque to tools with preferably round shanks.

In a first aspect, the present invention provides a chuck for retaining the shank of a tool bit or accessory inserted in a central channel at a distal end of said chuck, comprising at least one torsion spring mounted axially within a housing and having an inner dimension and shape comparable to said shank's outer dimension and shape, and mechanical means for winding and unwinding said torsion spring to respectively grip or release said shank, said winding being in a rotational direction consistent with a normal operating rotational direction of said chuck such that said shank tends to further wind said torsion spring for further self-tightening in normal operation.

In another aspect, the present invention provides a chuck for retaining the shank of a tool bit or accessory inserted into a central channel at a distal end of said chuck comprising a collet with at least two jaws mounted axially within a moveable sleeve, axial movement of said sleeve in one direction causing expansion of said at least two jaws to permit tool bit removal and axial movement in a second direction causing gripping of said tool bit by said device.

In yet a further embodiment, the present invention provides a chuck for retaining the shank of a tool bit or accessory inserted into a central channel at a distal end of said chuck comprising a collet with at least two jaws, mounted axially within a moveable sleeve, fractional rotational movement of said sleeve in one direction causing expansion of said at least two jaws to permit tool bit removal and fractional rotational movement in a second direction causing gripping of said tool bit by said device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2a is a side view of a torsion spring used in the first embodiment of the chuck;

FIG. 2b is an isometric view of the torsion spring used in the first embodiment of the chuck;

FIG. 7a is a cross-sectional view of the assembled chuck in the open position;

FIG. 7b is a cross-sectional view of the end of the assembled chuck in the open position;

FIG. 8 is a cross-sectional view of the second embodiment of the chuck for a rotary tool in the locked position;

FIG. 9 is a cross-sectional view of the end of the second embodiment of the chuck for a rotary tool in the locked position as indicated in FIG. 8;

FIG. 30 is a cross-sectional view of a third embodiment of the chuck in the open position;

FIG. 31 is a cross-sectional view of a third embodiment of the chuck with a tool bit or accessory in the locked position;

FIG. 39 is a cross section of the inner housing of the fourth embodiment of the chuck;

FIG. 40 is an end view of the inner housing as shown in FIG. 39;

FIG. 41 is a side view of the sleeve of the third and fourth embodiment of the chuck;

FIG. 42 is an end view of the sleeve shown in FIG. 41;

FIG. 43 is an end view of the tool bit or accessory used in the fourth embodiment of the chuck;

FIG. 44 is a side view of the tool bit or accessory shown in FIG. 43.

DETAILED DESCRIPTION

Generally, the present invention provides an improved chuck for a rotary tool.

Figure 1:
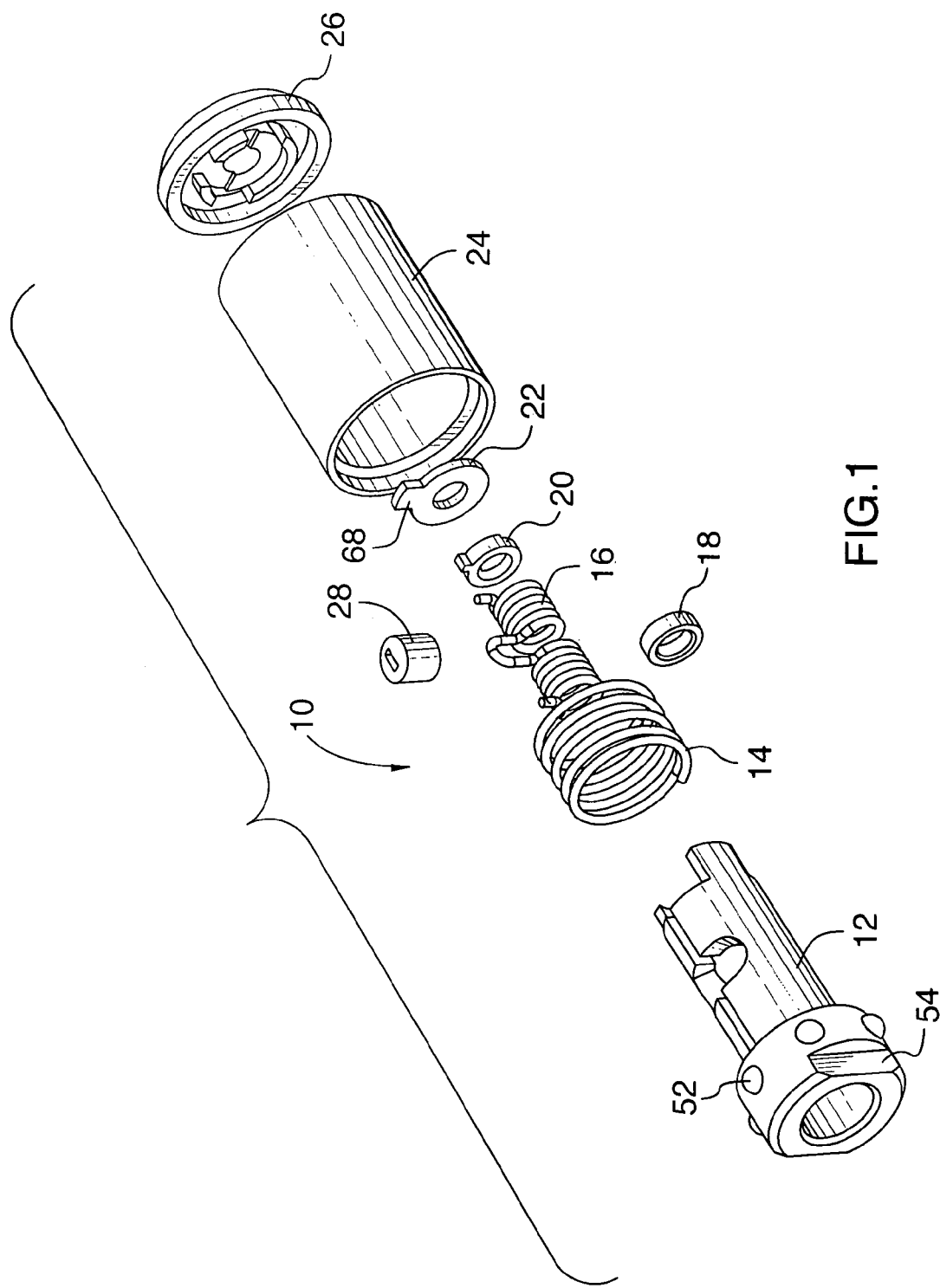
FIG. 1 is an exploded view of a first embodiment of a chuck for use with a rotary tool.

Turning to FIG. 1, an exploded view of apparatus of a chuck for a rotary tool is shown. The chuck 10 comprises an inner housing 12, a compression, or biasing, spring 14, a second spring 16, such as a torsion spring, a mid spacer 18, an end spacer 20, an inclined plate 22, a sleeve 24, an end cap 26 and a spring cap 28. As will be explained in greater detail later, the mid spacer 18, the end spacer and the inclined plate 22 are strictly optional features.

As shown in FIGS. 2a and 2b, the torsion spring 16 comprises a pair of spring sections 30a and 30b, each having an end tang 32a and 32b, which are connected to each other via a moveable tang portion, such as a central tang 34. In another embodiment, a pair of springs comprising a central tang and a pair of end tangs may also be used.

Figure 3A:
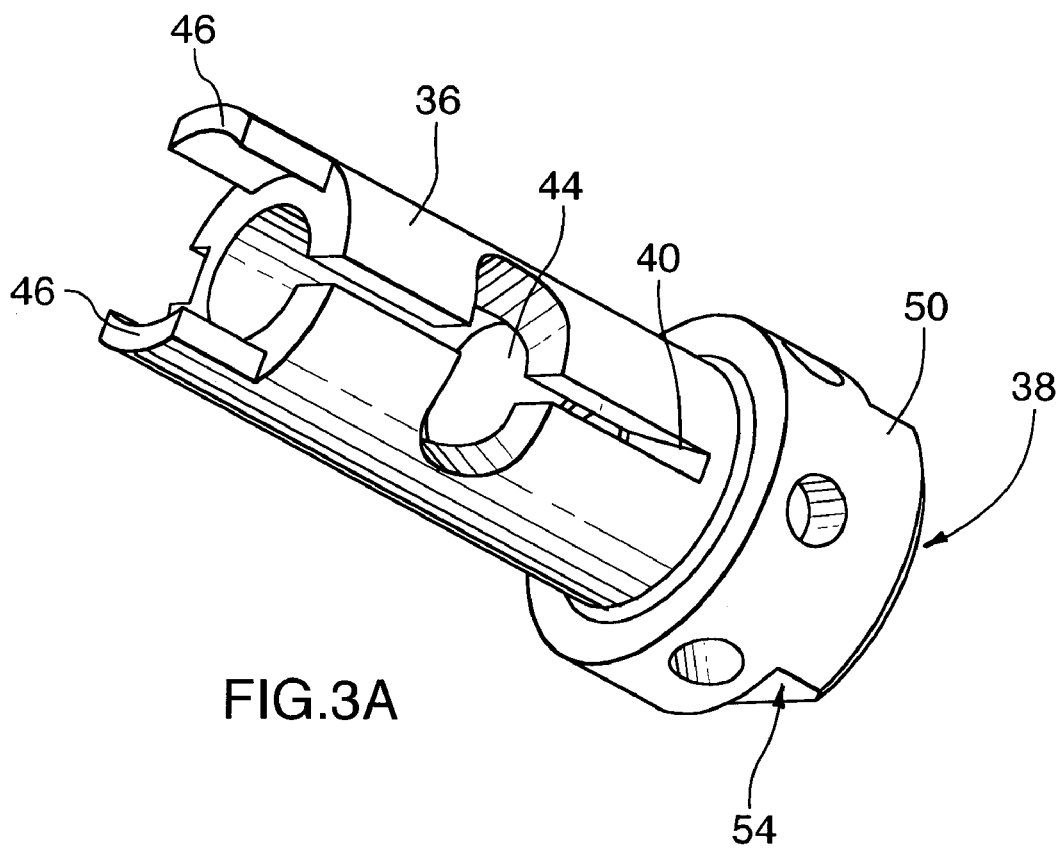
FIG. 3a is an isometric view of an inner housing for the first embodiment of the chuck.
Figure 3B:
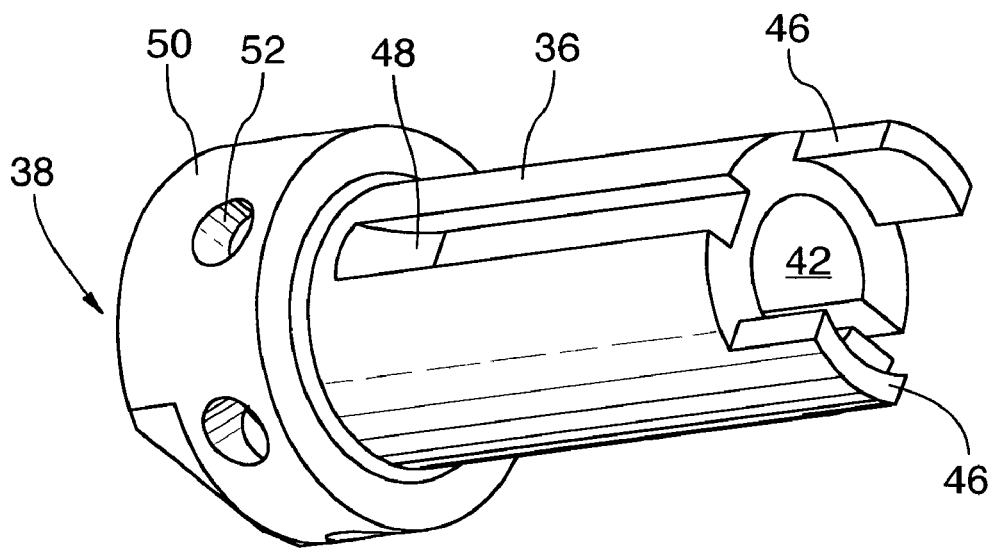
FIG. 3b is an isometric view of the inner housing.

FIGS. 3a and 3b provide more detailed schematics of the inner housing 12. FIG. 3a is a perspective view of the top of the inner housing and FIG. 3b is a perspective view of the bottom of the inner housing 12. The inner housing 12 comprises a first end 36 for receiving a shank of a tool bit or accessory and a second end 38 for attachment of the chuck 10 to a power tool. Examples of a tool bit or accessory include a drill bit, a mandrel or a grinding tool.

The first end 36 is preferably a cylindrical tube comprising a tang slot 40, preferably manufactured by milling, for receiving the end tangs 32a and 32b and the central tang 34 of the torsion spring 16 along with a central channel 42 for receiving the two spring sections 30a and 30b. The tang slot 40 comprises a radial, or circumferential, slot 44 for housing the central tang 34 after the torsion spring 16 has been inserted into the channel 42. The hole 44 provides an area for the central tang 34 to rotate when the sleeve is moved (as will be described below) along with an area for the central tang 34 to rotate in order to tighten the torsion spring 16 around the shank of the tool bit or accessory. After the torsion spring 16 has been inserted into the first end 36 of the inner housing 12, the spring cap 28, preferably a polymer cylinder, is fitted atop the central tang 34. The spring cap 28 provides protection to the central tang 34 from wear and tear against the sleeve and to reduce friction between the central tang 34 and the sleeve 24. Alternatives to the polymer cylinder include an oilite-type cylinder or any other bushing that is lubricant-impregnated.

The mid spacer 18 is placed between the two springs sections 30a and 30b to provide stability to the shank of the tool bit or accessory when the tool bit or accessory is inserted into the chuck. The mid spacer 18 also provides support for short shanks or shanks that have not been inserted to a required depth. The mid spacer 18 preferably has an outer diameter smaller than the diameter of the central channel 42 and an internal diameter slightly larger than that of the shank of the tool bit or accessory. Although the term diameter has been used to describe the apertures within which the shank of the tool bit or accessory is received, other dimensions may be used depending on the shape of the outer dimension of the shank.

A ridge, corresponding to the dimension of the end of the shank, which is cylindrical in the preferred embodiment but may be any shape such as notched or non-cylindrical, within the central channel 42 acts as a stopper to prevent the torsion spring 16 from entering the second end 38 of the inner housing 12. The inner diameter of the ridge is also sized to provide stability to the shank of the tool bit or accessory. An end portion, seen as a pair of prongs 46, is located opposite the annular ridge for connection with the end cap 26 when the chuck 10 is assembled.

The first end 36 of the inner housing 12 further comprises a second slot 48, seen as an alignment slot, for receiving an aligner such as a key. The key is preferably formed integral to the inside of the sleeve 24 as will be discussed in more detail below. The location of the alignment slot 48 is generally opposite to and substantially equal in length with the tang slot 40.

The second end 38 of the inner housing 12 comprises a shoulder 50 having a diameter larger than the outer diameter of the first end 36. The shoulder 50 comprises a centrifugally movable means, seen as a set of holes 52, each containing a spherical ball, preferably six, arranged at predetermined intervals around the surface of the shoulder 50. The centrifugally movable means prevent axial displacement or removal of the sleeve during use. A pair of flats 54 is also milled on the side of the shoulder 50 away from the first end 36 to assist in the tightening of the second end 38 onto the spindle of the power tool.

The compression spring 14 is assembled over the cylindrical tube of the first end 36 and has one end abutting the shoulder 50 and its other end abutting a shoulder 64 within the sleeve 24. It will be understood that the compression spring 14 is assembled over the cylindrical tube before the torsion spring 16 is inserted into the central channel 42.

Figure 4A:
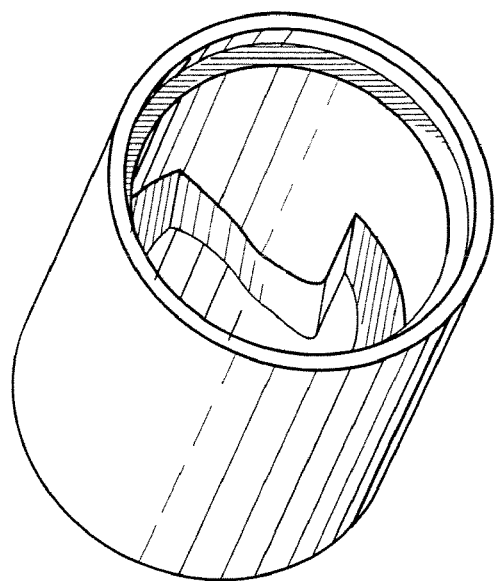
FIG. 4a is an isometric view of a sleeve used in the first embodiment of the chuck.
Figure 4B:
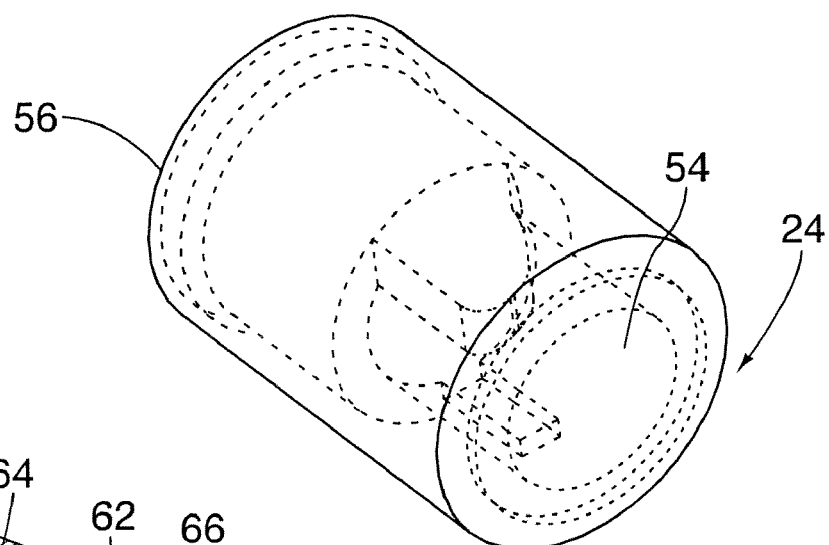
FIG. 4b is a transparent isometric view of the sleeve.
Figure 4C:
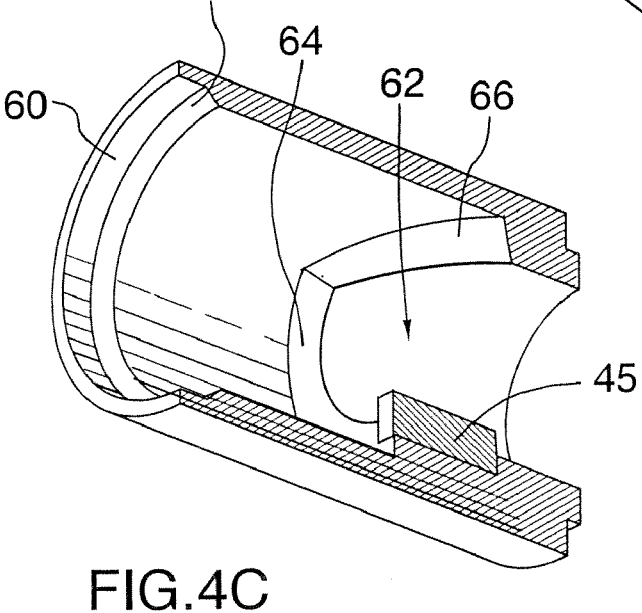
FIG. 4c is a sectional view of the sleeve.

Turning to FIGS. 4a to 4c, more detailed schematics of the sleeve 24 are shown. FIG. 4a is a perspective view from an end of the sleeve 24. FIG. 4b is a perspective view of the sleeve with broken lines indicating details within the sleeve 24 and FIG. 4c is a sectional view of the sleeve 24. The sleeve 24, which is preferably cylindrically shaped, comprises a first end 54 having an inner diameter which is less than the inner diameter of a second end 56.

The first end 54 of the sleeve 24 receives the end cap 26 while the second end 56 is shaped to form an inclined face 58 adjacent a straight-walled cross-section 60. An annular recess 62 is formed in the sleeve 24 to create the shoulder 64 along with a cam 66, which in the present embodiment is helical. The shoulder and the internal cam within the sleeve assist in providing mechanical means for winding and unwinding the torsion spring 16.

The sleeve 24 may be manufactured in a variety of methods including pressing, powder metal, injection moulding, die-casting, machining or a combination thereof but in the preferred embodiment is a die-cast piece. The preferred embodiment further comprises an aligner 44 45, formed on the internal diameter of the sleeve 24, sized to fit within the alignment slot 48 in the first end 36 of the inner housing 12.

The aligner 44 45 provides support when the chuck 10 is in use to prevent the sleeve 24 from unwanted rotational motion. The aligner also serves as a means to guide the sleeve when it is assembled over the inner housing.

When assembled to the inner housing 12, the sleeve 24 is oriented so that the aligner 44 45 is inserted into the alignment slot 48 with the internal cam 66 contacting the spring cap 28 covering the central tang 34. The sleeve 24 fits over the entire inner housing 12 to retain the spherical balls in the set of holes 52, the compression spring 14, and the aligner 44 45.

Turning back to FIG. 1, the optional inclined plate 22 is positioned adjacent to, and held in place by, the end spacer 20 to reduce accidental axial movement of the shank of the tool bit or accessory while the chuck 10 is in use. The inclined plate 22 is generally circular and has an internal diameter similar to the inner diameter of the mid-spacer 18 and the end-spacer 20. A tab 68 extends from one edge of the inclined plate 22.

Figure 5A:
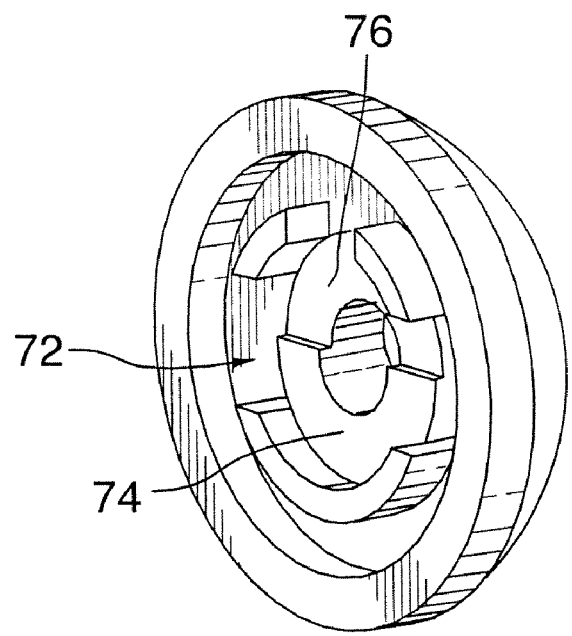
FIG. 5a is an isometric view of the end cap of the first embodiment of the chuck.
Figure 5B:
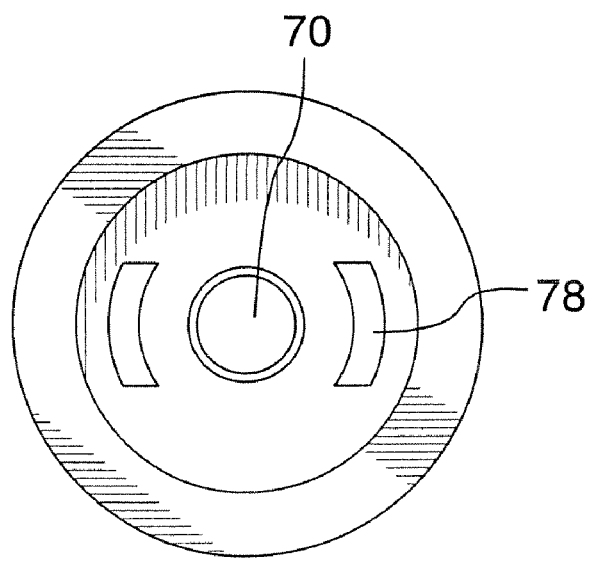
FIG. 5b is a side view of the end cap.

The end cap 26, shown in more detail in FIGS. 5a and 5b, comprises an outer diameter similar to the outer diameter of the sleeve 24 and an inner diameter similar to the inner diameter of the spacers. A hole 70 for receiving the shank of the tool bit or accessory is centrally located within the end cap 26. An inside face 72 of the end cap is shaped to fit over the inclined plate 22 with a bottom half 74 of the inside face 72 being thicker than a top half 76 of the inside face 72 causing the inclined plate 22 to be inclined upon contact with the end cap 26.

After the end cap 26 has engaged the second end of the sleeve 24, the prongs 46 from the inner housing 12 are inserted into a set of prong holes 78 in the end cap 26 and permanently attached via swaging, welding, peening, adhesive bonding, a plastic clip, ultrasonic welding, spin welding, a retaining ring or staking.

Figure 6A:
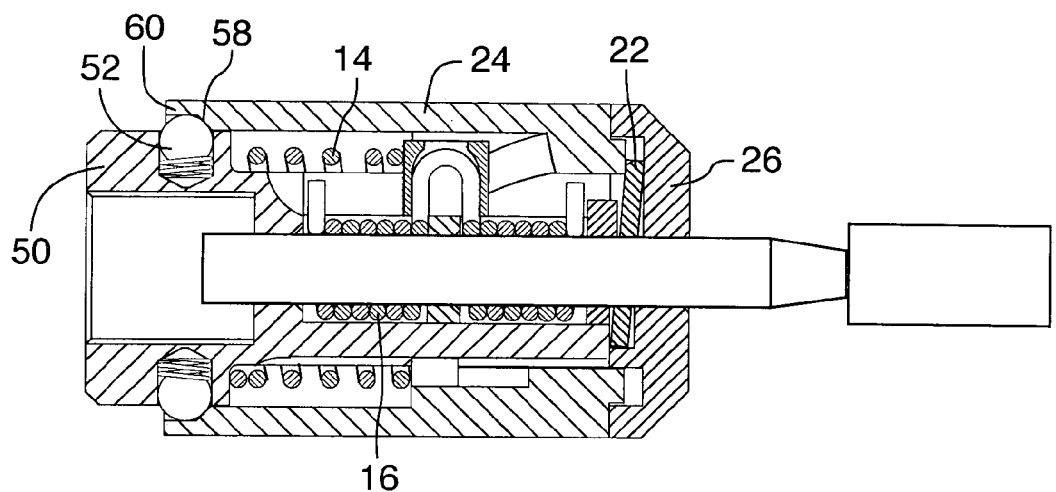
FIG. 6a is a cross-sectional view of the first embodiment of the assembled chuck in the locked position with a tool bit or accessory.
Figure 6B:
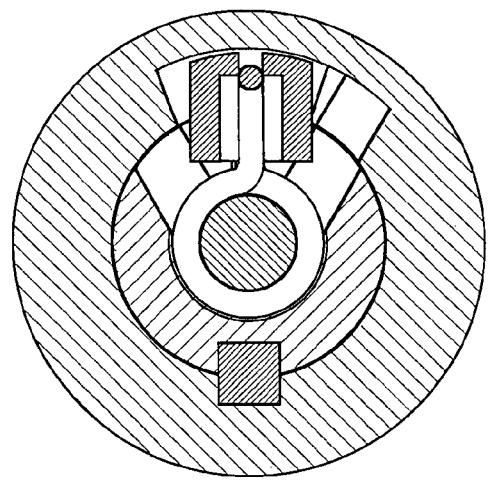
FIG. 6b is a cross-sectional view of the end of the assembled chuck in the locked position with a tool bit or accessory.

FIGS. 6a and 6b provide schematic diagrams of an assembled chuck in a locked position while FIGS. 7a and 7b provide schematic diagrams of the assembled chuck in an open position.

In the locked position, the chuck 10 is generally at rest. As can be seen in FIG. 6, the inclined face 58 and the cross-section 60 in the second end 56 of the sleeve 24 rests atop the shoulder 50 of the inner housing 12 to retain the spherical balls within the holes 52. Furthermore, the first end 54 of the sleeve 24 rests against the tab 68 of the inclined plate causing the plate to be inclined against the inner face 72 of the end cap 26. Rotation of the shank in a counter clockwise direction causes the torsion spring 16 to further tighten its grip on the shank by decreasing the internal diameter of the spring.

In the locked position, both the compression spring 14 and the torsion spring 16 are uncompressed.

In order to insert a tool bit or accessory into the chuck 10, the chuck 10 must be moved from the locked position to the open position. The chuck 10 is generally held in one hand and the sleeve 24 is retracted by the user in the direction indicated by arrow 80 of FIG. 7a causing the compression spring 14 to become compressed. The movement of the sleeve 24 also causes the spring cap 28 central tang 34 to travel along the helical cam 66, within the hole 44, increasing the internal diameter of the torsion spring 16 and enabling the removal and/or insertion of the shank of the tool bit or accessory into the end cap 26 and, subsequently, the first end 36 of the inner housing 12. In general, the helical cam causes the torsion spring 16 to unwind thereby releasing the shank. The retraction of the sleeve 24 also allows the inclined plate 22 to return to a substantially upright position so that the shank may be inserted.

Upon release of the sleeve 24 by the user, the compression spring 14 is released causing the chuck 10 to return to the locked position. The sleeve may also, in the absence of the compression spring, be manually moved between the locked and open positions. Along with the compression spring 14, the central tang 34 also biases the sleeve 24 back to the locked position by traveling back along the helical cam 66 within the hole 44. Movement of the central tang 34 back along the cam 66 winds up the torsion spring 16 to decrease the internal diameter of the spring 16 thereby causing the torsion spring 16 to grip the shank of the tool bit or accessory. The grip is enhanced by the frictional forces between the internal dimension of the spring and the outer dimension of the shank. The torsion spring provides torque in a required rotational direction and increased torque application results in an increased gripping force to reduce torsional or axial slippage.

To further retain the shank from axial movement when the chuck is in use, the optional inclined plate 22 is used. This stability of the inserted shank is assisted by the spherical balls. During operation of the power tool, the rotation of the chuck 10 creates a centrifugal force causing the spherical balls to be urged outwardly against the sleeve 24 (as shown in FIG. 6). This, in turn, results in the sleeve 24 being biased towards the end cap 26 placing a higher force against tab of the inclined plate 22 to further incline the inclined plate 22 against the inner face 72 of the end cap 26. This, in turn, causes the inclined plate 22 to further bear on the shank of the tool bit or accessory.

Figure 10:
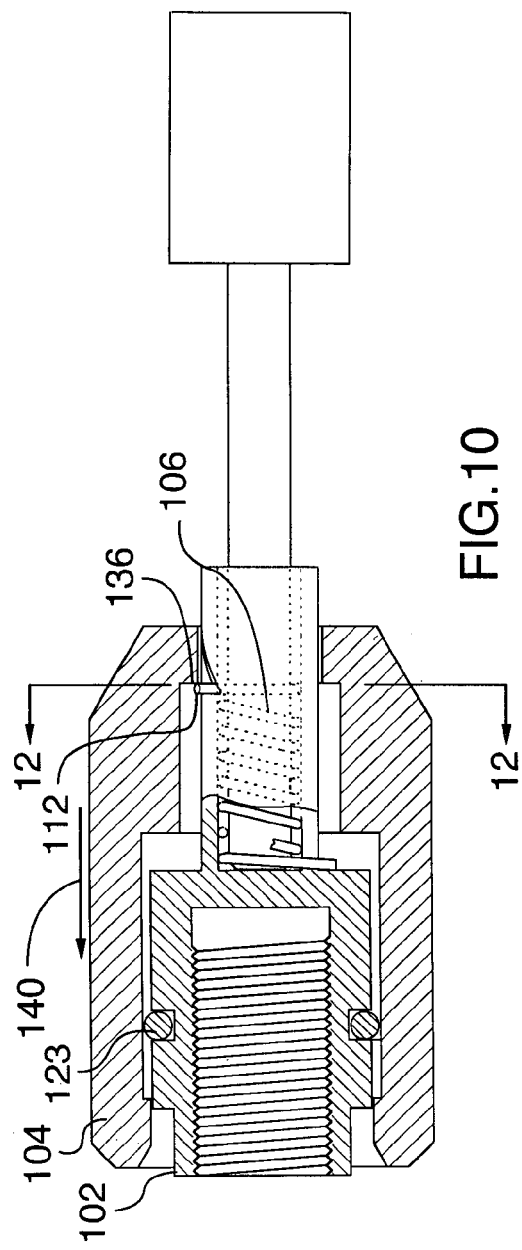
FIG. 10 is a cross-sectional view of the second embodiment of the chuck for a rotary tool in the open position.
Figure 12:
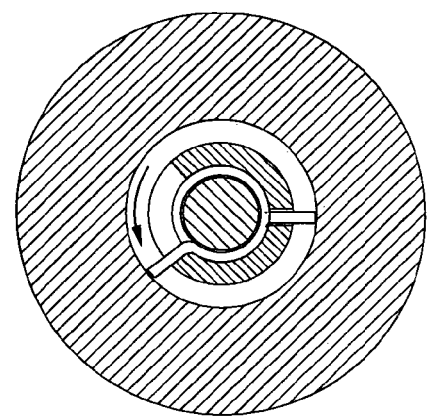
FIG. 12 is a cross-sectional view of the end of the second embodiment of the chuck for a rotary tool in the locked position as indicated in FIG. 10.
Figure 11:
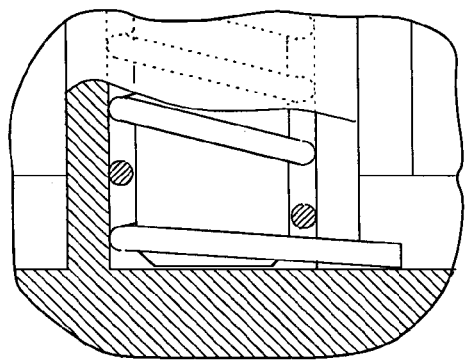
FIG. 11 is a detail drawing of the torsion spring as indicated in FIG. 10.
Figure 13:
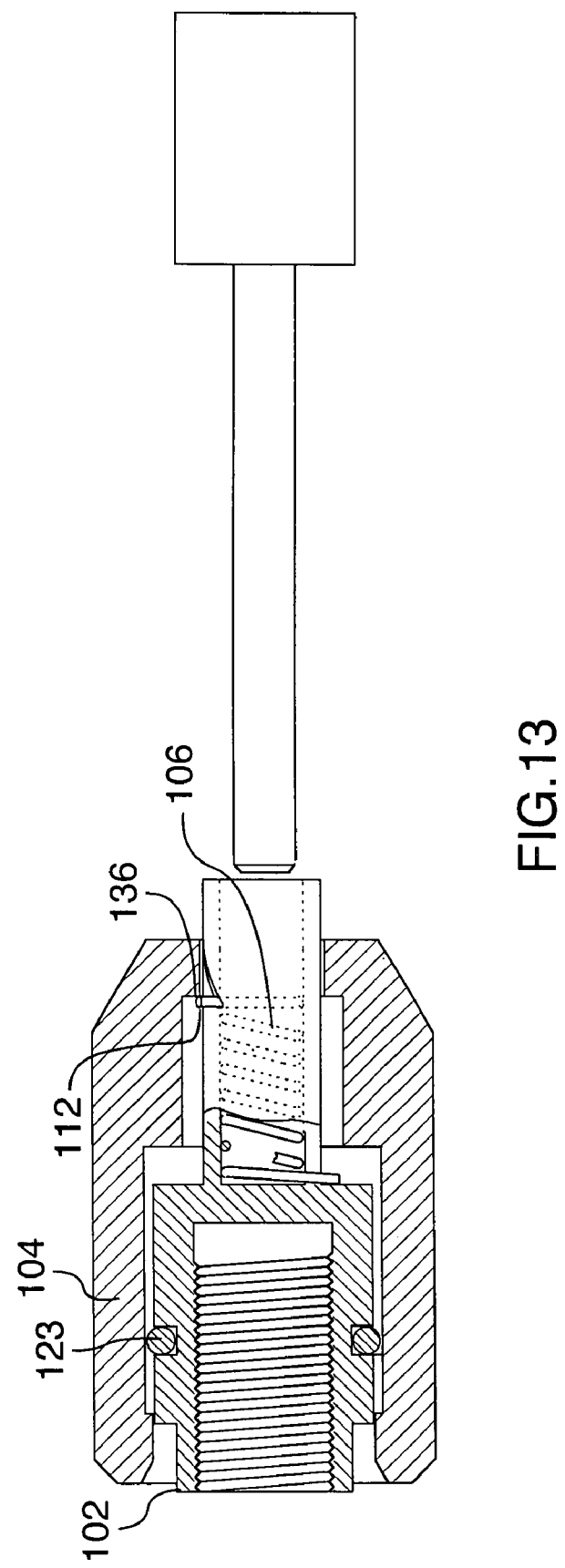
FIG. 13 is a cross-sectional view of the second embodiment of the chuck for a rotary tool in the open position with the tool bit or accessory removed.
Figure 14:
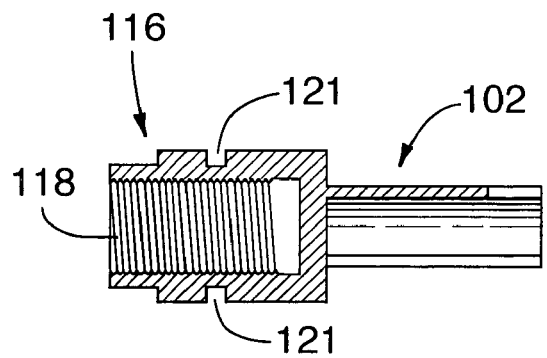
FIG. 14 is a cross-sectional view of the inner housing of the second embodiment of the chuck.
Figure 15:
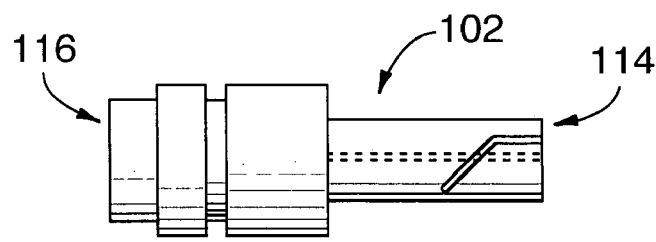
FIG. 15 is a side view of the inner housing of the second embodiment of the chuck.
Figure 16:
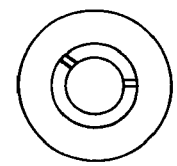
FIG. 16 is an end view of the inner housing as shown in FIG. 15.
Figure 17:
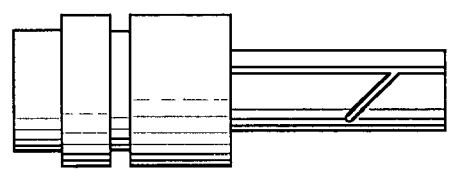
FIG. 17 is a side view opposite that of FIG. 15 of the inner housing of the second embodiment of the chuck.
Figure 18:
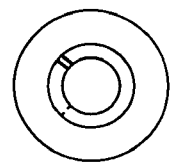
FIG. 18 is an end view of the inner housing as shown in FIG. 17.
Figure 19:
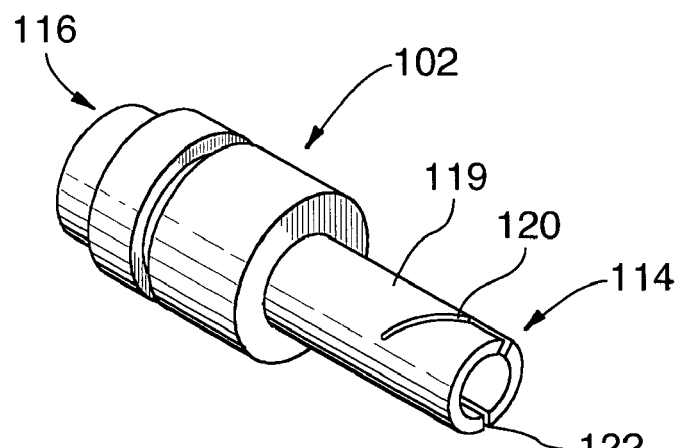
FIG. 19 is an isometric view of the inner housing of the second embodiment of the chuck.
Figure 20:
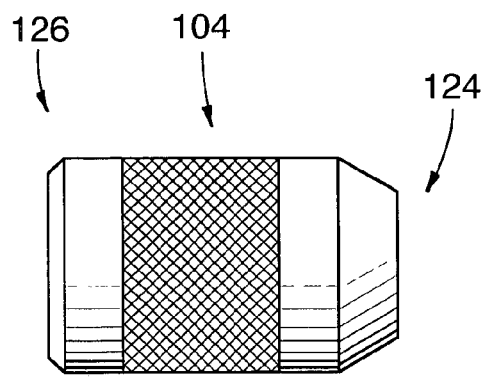
FIG. 20 is a side view of the sleeve of the second embodiment of the chuck.
Figure 21:
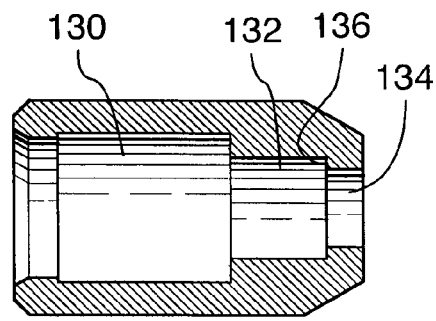
FIG. 21 is a cross-sectional view of the sleeve as shown in FIG. 20.
Figure 22:
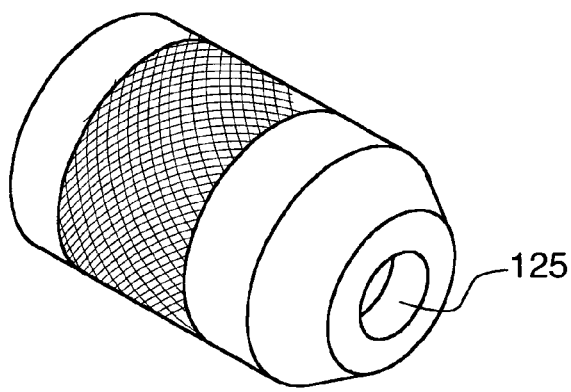
FIG. 22 is an isometric view of the sleeve of the second embodiment of the chuck.
Figure 23:
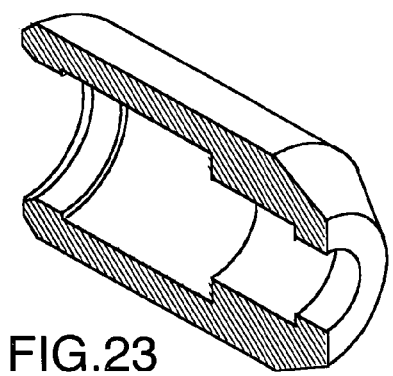
FIG. 23 is a sectional view of the sleeve as shown in FIG. 22.

Turning to FIGS. 8 to 29, schematic diagrams of second embodiment of a chuck for a rotary tool are provided. FIGS. 8 and 9 show the chuck in a locked position while FIGS. 10 to 12 show the chuck in an open position.

Figure 24:
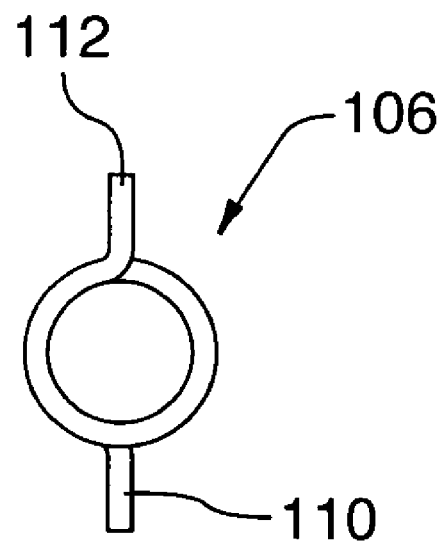
FIG. 24 is an end view of the torsion spring of the second embodiment of the chuck.
Figure 25:
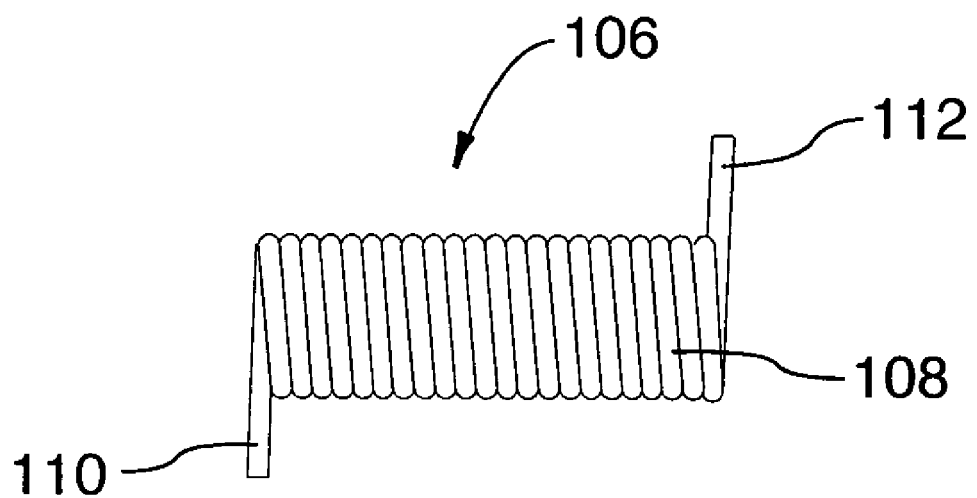
FIG. 25 is a side view of the torsion spring as shown in FIG. 24.
Figure 26:
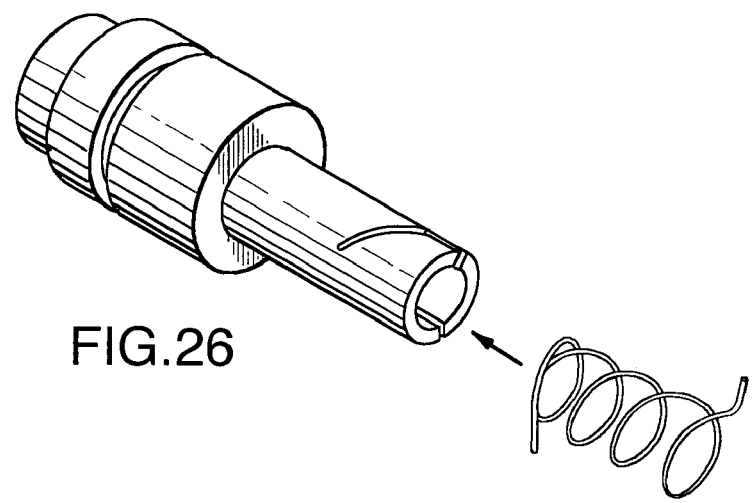
FIG. 26 is an isometric view of the inner housing and the torsion spring of the second embodiment.

A chuck 100 comprises an inner housing 102 (shown in more details in FIGS. 14 to 19), a sleeve 104 (shown in more details in FIGS. 20 to 23) and a spring 106, preferably a torsion spring, (shown in more details in FIGS. 24 to 25).

The torsion spring 106 comprises set of coils 108 with a pair of end tangs 110 and 112 located at opposite ends of the set of coils 108. The pair of end tangs 110 and 112 point in opposite directions as illustrated in both FIGS. 24 and 25.

Turning to FIGS. 14 to 19, the inner housing 102 is shown in more detail. The inner housing 102 comprises a first end 114 for receiving a shank from a tool bit or accessory and a second end 116, having a set of threads 118, for attaching the chuck 100 to an external drive shaft of a rotary or power tool (not shown).

The first end 114, seen as a cylindrical tube 119, comprises a first, angular, slot 120 for receiving one of the end tangs of the torsion spring 106 and for guiding the movement of the torsion spring 106. A second, alignment, slot 122, slightly offset or opposite, from the angular slot 120, receives the other end tang and aligns the torsion spring 106 within the first end 114 of the inner housing 102. When the torsion spring 106 is placed into the first end 114 of the inner housing 102, one of the end tangs 110 is inserted into the alignment slot 122 and the spring 106 is slid into a central channel provided by the cylindrical tube 119. The other end tang 112 is then received by the angular slot 120 after the spring 106 has been complete inserted into the central channel.

The inner housing 102 also comprises an annular groove 121 for housing a retaining ring 123 (as shown in FIG. 8) which prevents removal of the sleeve after assembly.

Turning to FIGS. 20 to 23, the sleeve 104 is preferably cylindrical and comprises a first end 124 having an opening 125 for receiving the shank of a tool bit or accessory and a second end 126 for receiving the inner housing 102. Between the first end 124 and the second end 126 are an inner housing portion 130, a spring portion 132 and a shank portion 134. As shown in FIGS. 20 to 23, the inner housing portion 130 is larger in diameter than the spring portion 132, which is larger in diameter than the shank portion 134. This may be more clearly seen in FIGS. 21 and 23. Between the spring portion 132 and the shank portion 134 is a shoulder 136 which contacts the end tang 112 in the angular slot 120 (as shown in FIG. 8).

The inner housing portion 130 generally surrounds the inner housing 102, the spring portion 132 surrounds the torsion spring 106 and the shank portion 134 receives the shank of the tool bit or accessory via the opening 125 in the first end 124.

In operation, the chuck 100 is generally in the locked position, as shown in FIGS. 8 and 9 or the open position, as shown in FIGS. 10 to 12.

In the locked position, the torsion spring 106 is uncompressed with the end tang 112 located at an edge of the angular slot 120 and the end tang 110 located in the alignment slot 122. It will be understood that the end tang 110 may also be located in the angular slot 120 while the end tang 112 may be located in the alignment slot 122. The uncompressed torsion spring 106 grips the shank of the tool bit or accessory in order to prevent the tool bit or accessory from falling out of the housing. As is known by one skilled in the art, the rotation of the shank of the tool bit or accessory is generally in a clockwise direction with respect to the user. Rotation of the shank in a counter clockwise direction causes the torsion spring 106 to further tighten its grip on the shank by decreasing the internal diameter of the spring 106.

In order to change or remove the tool bit or accessory, the chuck 100 is placed in the open position. By retracting the sleeve 104 away from the tool bit or accessory, in the direction indicated by arrow 140, the shoulder 136 contacts the end tang 112 and directs the end tang 112 along the angular slot 120 towards the opposite end of the angular slot 120. Since the other end of the torsion spring 106 is restricted from moving by the inner housing (as shown in FIG. 11), the torsion spring 106 is unwound as the end tang 112 is directed along the angular slot causing the internal diameter of the torsion spring 106 to increase. The movement of the sleeve 104 also causes the first end 114 of the inner housing 102 to protrude through the hole 125 in the sleeve 104. The increase in the internal diameter of the spring 106 causes the grip of the spring 106 on the shank to loosen, allowing the shank to be removed. After the shank has been removed, the user may place another shank into the inner housing 102 via the opening 125 in the sleeve 104 as schematically showed in FIG. 13. Release of the sleeve by the user causes the chuck to return to the locked position and the internal diameter of the torsion spring to decrease which allows the spring to grip the shank of the selected tool bit or accessory.

Figure 27:
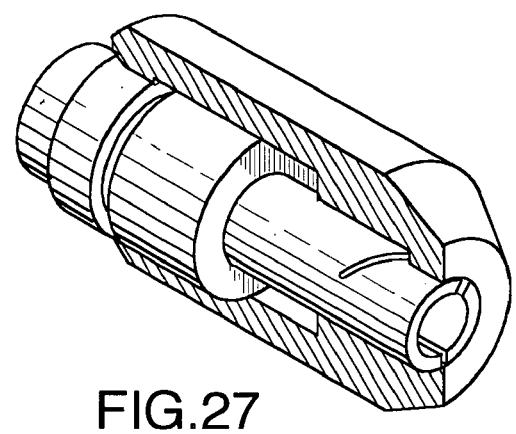
FIG. 27 is a sectional view of the inner housing with the sleeve in the locked position.
Figure 28:
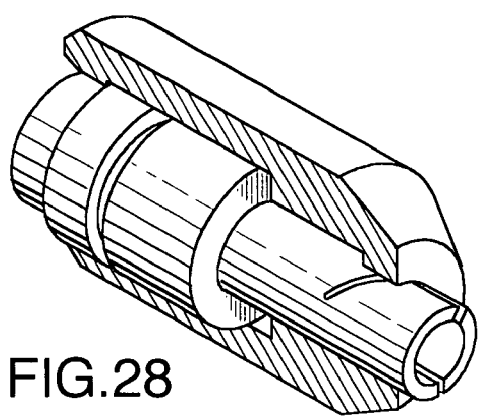
FIG. 28 is a sectional view of the inner housing with the sleeve in the open position.
Figure 29:
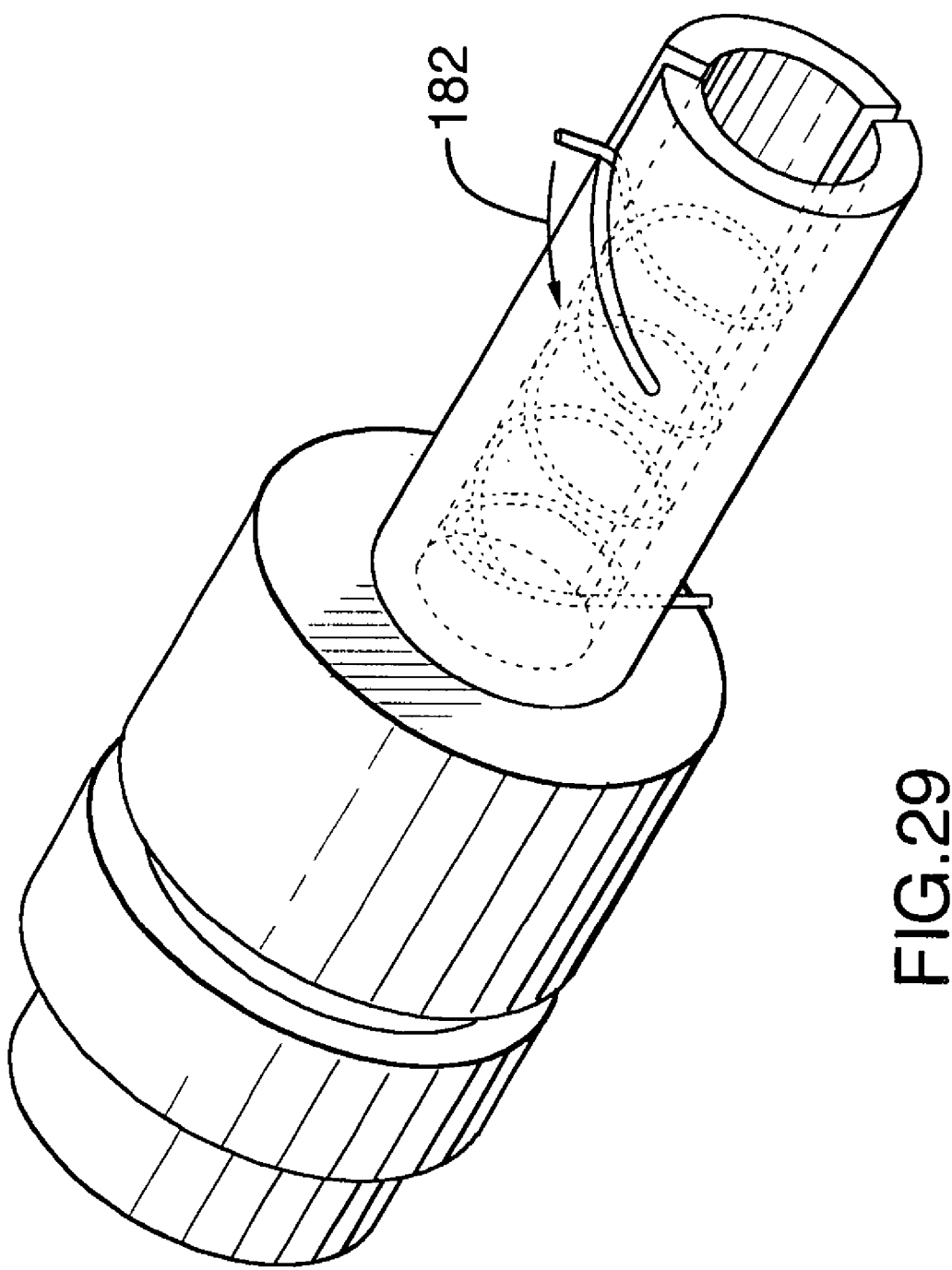
FIG. 29 is a detailed view of the torsion spring within the innerhousing.
Figure 32:
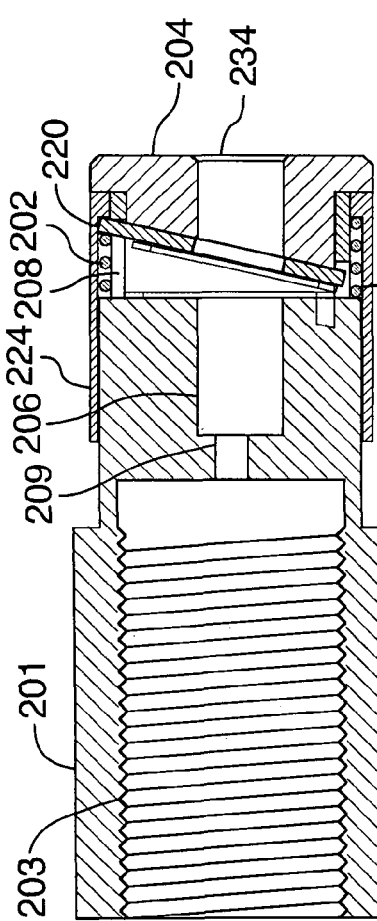
FIG. 32 is a cross-sectional view of the third embodiment of the chuck in the locked position.
Figure 33:
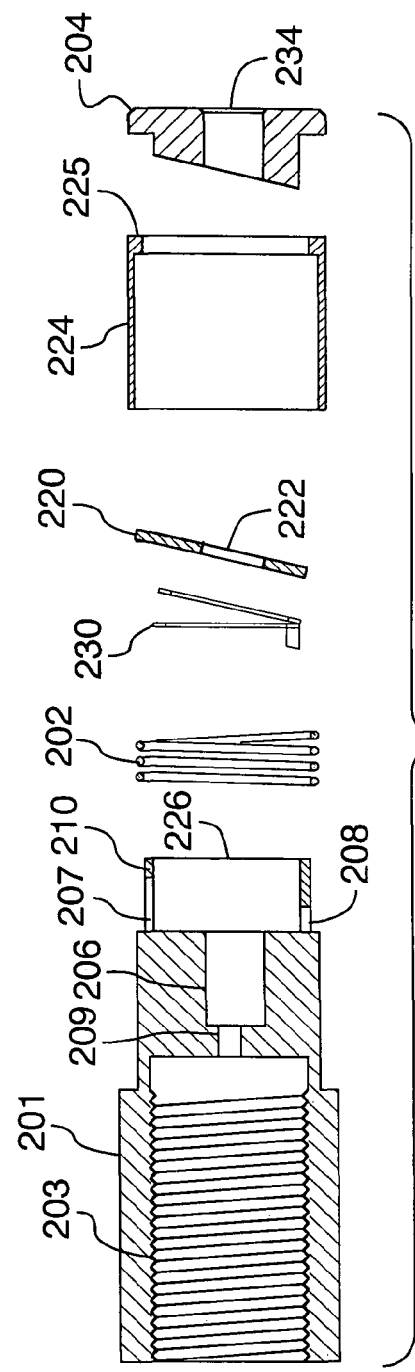
FIG. 33 is an exploded view of the third embodiment of the chuck.

FIGS. 27 and 28 provide schematic views of the sleeve 104 and the inner housing 102 of the chuck 100 in the locked and open positions, respectively. FIG. 29 is a schematic diagram of the inner housing with the end tangs 110 and 112 of the torsion spring 106 inserted into the alignment 122 and angular slots 120. An arrow 182 displays the direction of travel by the end tang 112 when the chuck 100 is being moved from the locked position to the open position.

FIGS. 30 to 48 show an alternative embodiment of the chuck using an inclined plate to capture the shank of a tool bit or accessory. This is similar in principle to the mechanism described in application Ser. No. 09/783,082, filed Feb. 15, 2001 and assigned to the present inventors' company, Maxtech Manufacturing Inc. In this embodiment, the chuck 200 has a sleeve 224 over an inner housing 201, biased against an end cap 204 by a spring 202, such as a compression, or biasing, spring. The inner housing 201 has a central channel for receiving and holding the shank of a tool bit or accessory. The end cap 204 is inserted into a central opening in the distal end of the inner housing 201. The end cap 204, shown in FIGS. 47 and 48, has a central aperture 234 having a comparable size and to that of the shank 212 of a tool bit or accessory 211. The end cap 204 has an inner surface, which is on an incline relative to the axis of the tool.

Within the sleeve 224, an inclined plate 220 is biased against the angled inner surface of the end cap 204 by a spring 230, when the sleeve 224 is in a released position as in FIG. 31. The inclined plate 220 has a central aperture 222 shaped to receive the shank and having a smaller axial opening when angled relative to the axis of the tool. This smaller axial opening grips the shank of the tool bit or accessory when the inclined plate is in the angled position.

Figure 36:
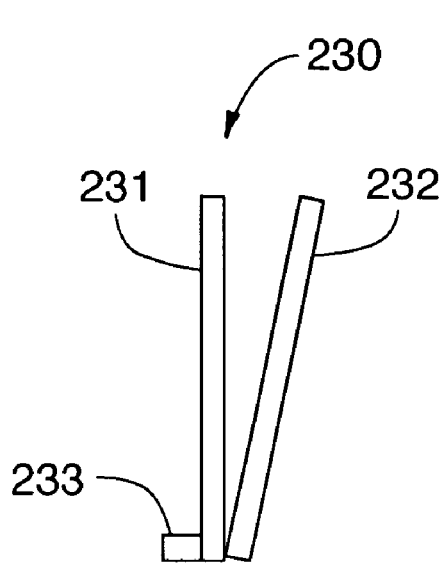
FIG. 36 is a side view of the spring used in the third and fourth embodiment of the chuck.
Figure 37:
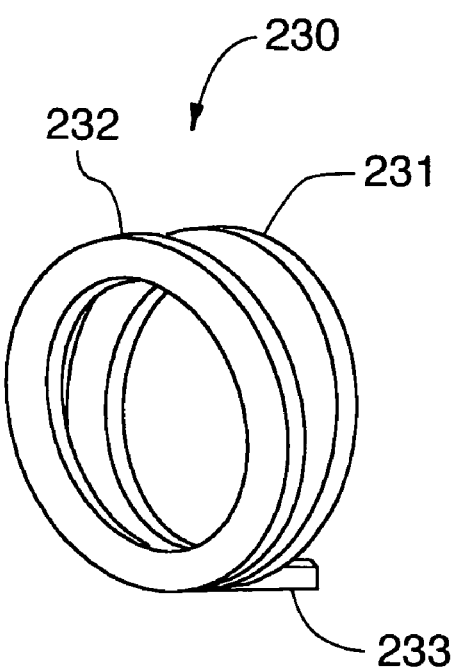
FIG. 37 is an isometric view of the spring as shown in FIG. 36.
Figure 38:
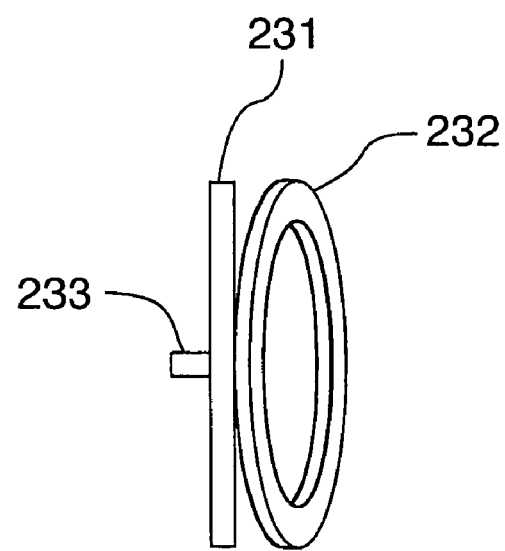
FIG. 38 is a bottom view of the spring in FIG. 36.

When the sleeve 224 is retracted away from the end cap 204, as in FIG. 30, the sleeve pulls the plate towards the inner housing 201, compressing the compression spring 202, and straightening the plate 220 to an angle at or closer to a 90-degrees to the axis of the tool, allowing for the removal or insertion of the shank of a tool bit or accessory. The spring 230, shown in detail in FIGS. 36-38, is also compressed when the inclined plate is straightened. FIG. 31 shows the chuck 200 when the sleeve is in the locked position and the shank of the tool bit being gripped by the inclined plate 220. In this position, the spring returns to its original shape and butts against the inclined plate 220.

The spring preferably has an upright loop 231 and an inclined loop 232 and a spring tang 233. The spring tang 233 juts out from the external surface of the upright loop 231. At one end of the upright loop 231, the inclined loop 232 and the spring tang 233 are connected to the upright loop 231 on opposite sides of the upright loop 231. The inclined loop 232 of the spring 230 is pushed towards the upright loop 231 when the inclined plate 220 is straightened as the sleeve is retracted. The spring tang 233 is inserted into a corresponding hole 206 in the inner housing 201, thereby preventing the spring 230 from moving away from the inner housing 201 when the sleeve 224 is retracted or released.

FIGS. 39 and 40 show views of the inner housing. The inner housing 201 has a threaded central channel 203 for joining to the rotary tool, and a machined channel into which the shank 212 of a tool bit or accessory 211 fits. The outer surface of the inner housing 201 has an annular shoulder 205 where the compression spring 202 and the sleeve 224 fits over the inner housing. The inner housing 201 also has an end portion 210 with a central channel 226 into which the end cap 204 fits. The end portion 210 has two slots 207, 208 in the housing, radially opposite one another. The first slot 207 is axially longer than the second slot 208. The protuberances 223 of the inclined plate 220 shown in FIGS. 45 and 46, fit into these slots 207, 208. The protuberance in the first elongated slot 207 moves along the slot 207 when the sleeve 224 is retracted and released.

FIGS. 41 and 42 show views of the sleeve. The sleeve 224 is an annular ring, preferably made of metal, and is preferably knurled to help the user grip the sleeve when retracting it. The sleeve has a shoulder 225 to limit the movement of the sleeve 224 on the shoulder 205 of the inner housing.

Figure 48:
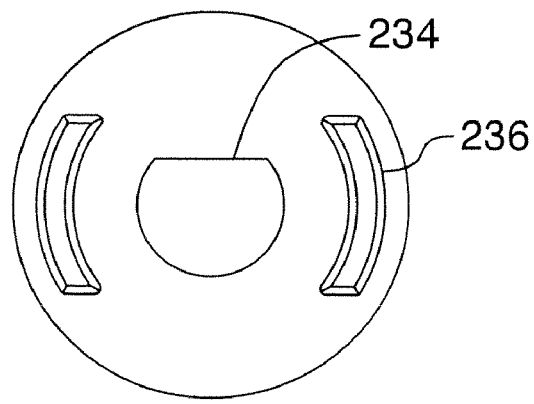
FIG. 48 is an end view of the end cap shown in FIG. 48.

As seen in FIGS. 43 and 44, the tool shank 212 preferably has a machined or otherwise flattened portion 218 to allow for torque transfer between the inclined plate 220 and the tool bit or accessory 211. The central channel 206 of the inner housing 201 as shown in FIG. 40, the central aperture 234 of the end cap 204 as shown in FIG. 48, and the central aperture 222 of the inclined plane 220, as shown in FIG. 46, all preferably have a similar shape as the machined shank 218.

Figure 34:
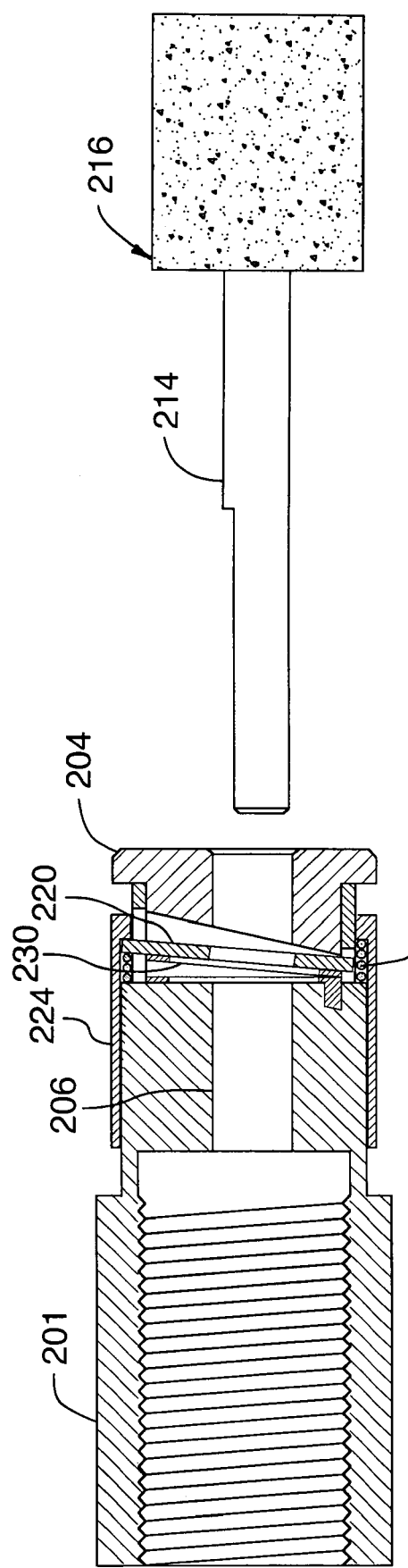
FIG. 34 is a cross-sectional view of a fourth embodiment of the chuck in the open position.
Figure 35:
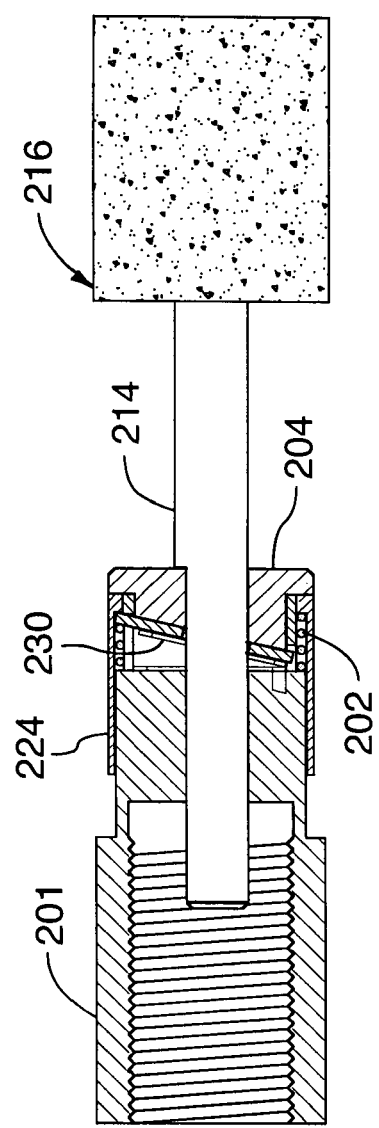
FIG. 35 is a cross-sectional view of the fourth embodiment of the chuck in the locked position.

If desired, then as shown in FIGS. 30 to 33, the end of the tool shank 212 may be provided with a flattened tongue 213 which fits in a correspondingly-shaped slot 209 in the inner housing 201, to provide greater torque to the tool bit or accessory 211 than might otherwise by possible through just the angled plate. FIGS. 34 and 35 show the tool shank 214 without the flattened tongue and the inner housing without the corresponding slot.

Figure 45:
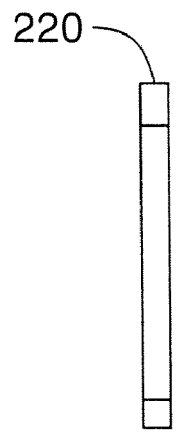
FIG. 45 is a side view of the inclined plate used in the third and fourth embodiment of the chuck.
Figure 46:
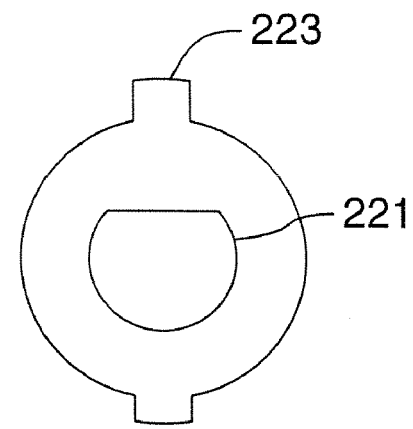
FIG. 46 is an end view of the inclined plate shown in FIG. 45.
Figure 47:
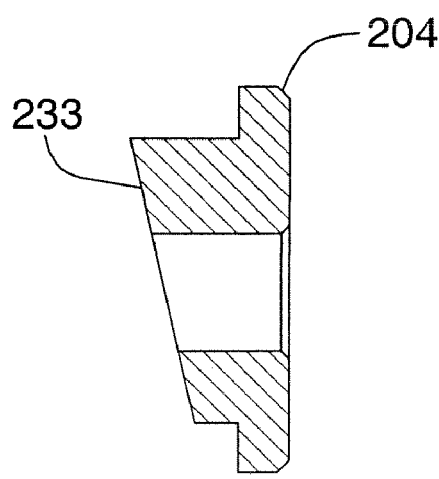
FIG. 47 is a cross-sectional view of the end cap used in the third and fourth embodiment of the chuck.

FIGS. 45 and 46 show views of the inclined plate. The inclined plate 220 is preferably a ring of metal with a central aperture 222 shaped to accommodate a shank 212 from a tool bit or accessory 211. The inclined plate 220 preferably has at least two protuberances 221 jutting out in radially opposite locations from the circumference of the plate. These protuberances rest in the first elongated slot 207 and the second slot 208 on the end portion 210 of the inner housing 201.

Figure 49:
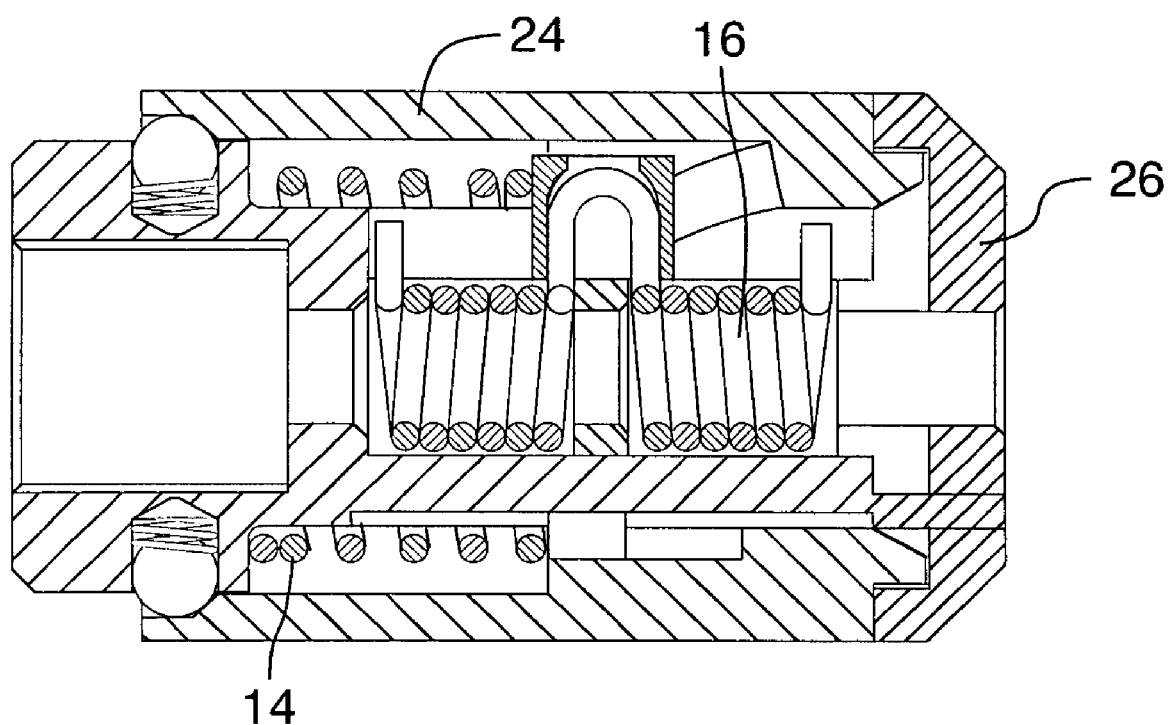
FIG. 49 is a cross-sectional view of a fifth embodiment of the chuck in the locked position with a tool bit or accessory.

Turning to FIG. 49, yet another embodiment of a chuck for use with a rotary tool is shown. This embodiment is similar to the one described above with respect to FIGS. 1 to 7 with the difference being that the chuck does not include an inclined plate. Furthermore, the inside face of the end cap 26 may be smooth. This embodiment operates in a manner identical to the embodiment described in FIGS. 1 to 7.

Figure 50:
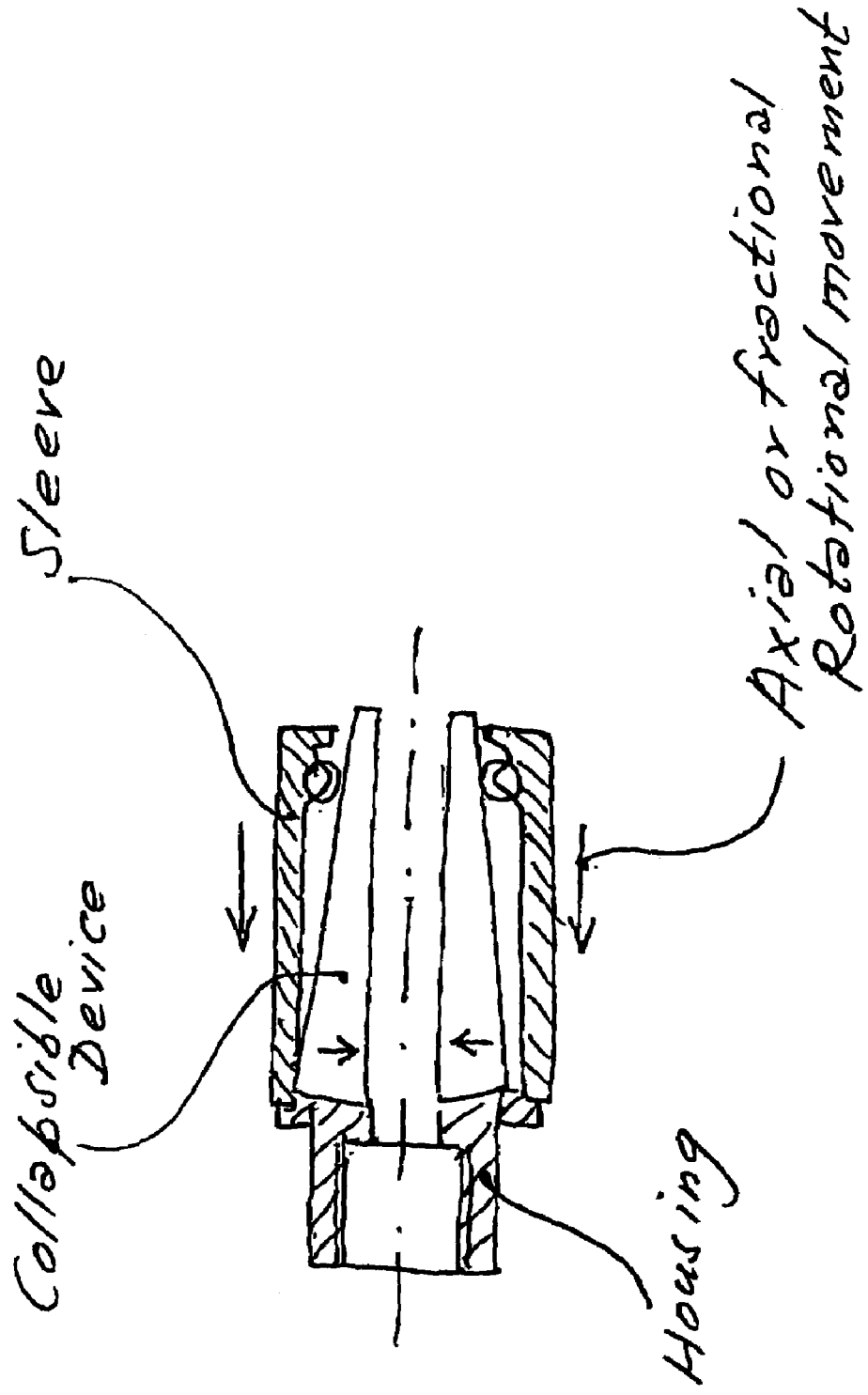
FIG. 50 is a sectional of a sixth embodiment of the chuck.

FIG. 50 is a sectional view of a further embodiment of a chuck for use with a rotary or power tool.

In another embodiment, the shank of the tool bits or accessories may include notches on the shank to provide additional means of retention (as with standard power bits for screwdrivers) whereby the inner housing comprises notch receiving means located within said central channel for receiving the notches on the shank.

Furthermore, the chuck 100 may include a collapsible collet inside the torsion spring 16. The collet is placed inside the spring and distributes the holding forces along the length of the shank of the tool bit or accessory.

In yet another embodiment, the chuck 100 further comprises means for attachment with a router or drywall cutting tool such as a Roto-Zip attachment.

An advantage of using a multi-sectional torsion spring instead of a single piece is that possible to substitute it with other biasing means that provide the same torque requirements such as a standard torsion spring, or perhaps springs having irregularly-spaced coils that optimize torque application.

Another embodiment may be to use separate springs for clockwise and counter-clockwise torque applications. Currently, most rotary tools operate in a clockwise rotation. However, it may be necessary in the future to require rotation in the counter-clockwise direction.

Centrifugal mechanisms, such as a scissor mechanism, a dog lock or fly-weights may also be used to tighten the grip of the torsion spring around the shank of the tool bit or accessory during use.

It will be understood that depending on the type of centrifugal movable means, the inclined face 58 may be a wall which is perpendicular to the cross-section 60.

The chuck may further comprise an expansion spring near the end cap that expands when the central tang is rotated by the helical cam, to prevent the sleeve from returning to its normal position before the shank is installed.

In order to determine if the shank of the tool bit or accessory has been inserted to the correct depth, the chuck may further comprise means for recognition/detection of the insertion depth of the shank such as via a transition element.

To ensure a consistent internal diameter of the torsion springs, since there is typically a fair degree of variance in the manufacturing process, the internal diameter of the torsion springs may be altered by various methods such as grinding, machining or honing. In some cases, very little metal may be removed, and in other cases more. An added advantage of this operation is that it in effect flattens the inner surface of the springs, providing more surface area for contacting the shank.

Conventional springs have a round cross-section, resulting in "lines" of contact between the spring and the piece to be gripped. Springs having different cross-sections may also be utilized, such as square, rectangular, etc. When these are used, the area of contact is larger and the effective gripping force increases.

In yet another embodiment, if the key is not integrally formed as part of the sleeve, both the cylindrical tube and the sleeve have alignment slots for receiving a key. The size of the key is manufactured such that its length is longer than the length of each slot so that the key does not slide out of either of the two slots.

In addition to the variations described above, for example, the sleeve could be configured so as to actuate the torsion spring by rotation of the sleeve relative to the housing, though the preferred embodiment involves axial movement of the sleeve as described above.

In yet another embodiment, the chuck comprises an expandable and collapsible device actuated by the sleeve that may be either manually biased or spring biased. When the sleeve is pulled in one direction, the device expands permitting tool bit removal and replacement of another tool bit. When the sleeve is urged in the opposite direction, the device grips the shank of the tool bit and locks the shank in position eliminate the need for a torsion spring. The end of the tool shank may be provided with flats or a non-circular shape that fits into a correspondingly shaped recess on the housing to provide additional drive. The expansion and gripping actions of the device may also be achieved by rotational movement of the sleeve.

Conventionally, chucks are designed to accommodate to shanks of tool bits or accessories of varying size, whereas one aspect of the present invention is related to chucks and tool bit shank combination of a fixed size conforming to known tolerance rangers for manufacture.

The above-described embodiments of the present invention are intended to be examples only. Alterations, modifications and variations may be effected to the particular embodiments by those of skill in the art without departing from the scope of the invention, which is defined solely by the claims appended hereto.

The invention claimed is:

1. A chuck for retaining the shank of a tool bit or accessory inserted in a central channel at a distal end of said chuck, comprising at least one torsion spring mounted axially within a housing and having an inner dimension and shape comparable to the shank's outer dimension and shape, and mechanical means for winding and unwinding said torsion spring to respectively grip or release said shank, wherein said at least one torsion spring has a resting inner dimension less than said shank's outer dimension, such that said torsion spring must be partially unwound for said shank to be inserted.

2. A chuck as in claim 1, wherein said means for winding and unwinding said torsion spring comprises a movable sleeve, axial movement of said sleeve producing rotation of said at least one torsion spring.

3. A chuck as in claim 2, wherein said sleeve has an internal profile configured to act on a moveable tang portion of a said torsion spring to produce movement of said tang portion when said sleeve moves axially, said movement of said moveable tang portion winding or unwinding said torsion spring.

4. A chuck as in claim 3, wherein a said torsion spring has a secured end tang and a free end tang, said free tang constituting said moveable tang portion, wherein a portion of said sleeve contacts said free end tang to produce said movement, and wherein said free end tang rides in a slot in said housing, said slot being angled away from an axial direction such that movement of said sleeve causes said tang to move along said slot, thereby winding or unwinding said torsion spring.

5. A chuck as in claim 3, wherein a said torsion spring has opposite end tangs which are secured, and a central tang, said central tang constituting said moveable tang portion, wherein said torsion spring is wound in opposite directions on opposite sides of said central tang portion, such that movement of said central tang portion produces winding or unwinding of said torsion spring.

6. A chuck as in claim 5, wherein said sleeve has an internal profile angled away from an axial direction, such that movement of said sleeve causes movement of said central tang portion by said internal profile acting against said central tang portion.

7. A chuck as in claim 6, wherein said central tang portion has an overlying cap thereon, said cap extending through a circumferential slot in said housing for engagement by said internal profile of said sleeve.

8. A chuck as in claim 2, further comprising a biasing spring arranged to bias said sleeve to an extended position wherein said torsion spring has an inner diameter less than the shank's diameter, to grip said shank, and wherein moving said sleeve to a retracted position unwinds said torsion spring to release said shank.

9. A chuck as in claim 8, further comprising centrifugally-movable means between said housing and said sleeve, arranged such that centrifugal outward movement of said centrifugally-movable means prevents retraction of said sleeve and thereby prevents releasing of said shank.

10. A chuck as in claim 9, wherein said centrifugally-movable means comprises a plurality of balls, and wherein said sleeve has a surface engaged by each ball when said balls move outwardly, said engagement preventing retraction of said sleeve.

11. A chuck as in claim 1, wherein said shank is cylindrical.

12. A chuck as in claim 1, further comprising at least one cross member disposed within said housing and having a fixed axial aperture, said aperture sized to receive said shank with minimal clearance, thereby urging said tool bit or accessory to remain axially oriented.

13. A chuck as in claim 1, wherein there are at least two said torsion springs.

14. A chuck as in claim 13, wherein at least one said torsion spring is oriented in one rotational direction, and at least one other said torsion spring is oriented in the opposite rotational direction, whereby said shank is secured in either direction of rotation of said chuck.

15. A chuck as in claim 1, further comprising a plate positioned in said chuck and having a central axial aperture which is slightly larger than a cross-section of said shank when said plate is at 90 degrees to the axis, but which corresponds in cross-section to said shank when said plate is angled away from 90 degrees, said plate being pivotable such that extraction of said shank increases said angling away and thereby tightens said plate on said shank to prevent extraction, further comprising means for straightening said plate towards the 90 degree position, to permit extraction of said shank.

16. A chuck as in claim 2, wherein said sleeve is die-cast metal.

17. A chuck as in claim 1, wherein the internal diameter of the torsion springs has been altered by mechanical means selected from the group consisting of grinding, machining, honing and other metal-removing means.

18. A chuck as in claim 1, further comprising a collapsible collet inside said torsion spring, for distributing shank-retention forces along a length of the shank.

19. A chuck as in claim 2, further comprising an end cap on an end of said sleeve, permanently attached thereto by a process selected from the group consisting of swaging, welding, peening, adhesive bonding, clipping via a plastic clip, ultrasonic welding, spin welding, staking, or retaining via a retaining ring.

* * * * *

UNITED STATES PATENT AND TRADEMARK OFFICE
CERTIFICATE OF CORRECTION

PATENT NO. : 7,278,640 B2  
APPLICATION NO. : 10/632977  
DATED : October 9, 2007  
INVENTOR(S) : Scott W. Allan et al.

It is certified that error appears in the above-identified patent and that said Letters Patent is hereby corrected as shown below:

On the Title Page Item (57) Abstract:  
Line 9, delete "said" and insert --the-- chuck On the Title Page Item (57) Abstract:  
Line 10, delete "said" and insert --the-- shank Column 3, Line 45, delete "innerhousing;" and insert --inner housing;--

Column 5, Line 65, delete "44"

Column 6, Line 1, delete "44"

Column 6, Line 6, delete "44"

Column 6, Line 11, delete "44"

Column 13, Line 15, delete "said" and insert --the--

Signed and Sealed this

Thirteenth Day of May, 2008

JON W. DUDAS  
*Director of the United States Patent and Trademark Office*